US008421845B2

(12) United States Patent
Ishiyama et al.

(10) Patent No.: US 8,421,845 B2
(45) Date of Patent: Apr. 16, 2013

(54) METHOD, APPARATUS, AND PROGRAM FOR GENERATING A STEREOSCOPIC LAYOUT IMAGE FROM A PLURALITY OF LAYOUT IMAGES

(75) Inventors: Eiji Ishiyama, Miyagi (JP); Mikio Watanabe, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 1052 days.

(21) Appl. No.: 12/414,285

(22) Filed: Mar. 30, 2009

(65) Prior Publication Data

US 2009/0244265 A1 Oct. 1, 2009

(30) Foreign Application Priority Data

Mar. 28, 2008 (JP) ................................ 2008-085330

(51) Int. Cl.
*H04N 13/00* (2006.01)
(52) U.S. Cl.
USPC ................... 348/42; 348/47; 348/48; 348/50; 348/51; 715/757
(58) Field of Classification Search .............. 348/51, 348/E13.043, 42, 47, 48, 50; 715/757
See application file for complete search history.

(56) References Cited

U.S. PATENT DOCUMENTS

| | | | |
|---|---|---|---|
| 6,078,334 A | 6/2000 | Hanaoka et al. | |
| D613,300 S * | 4/2010 | Chaudhri | D14/488 |
| 2003/0048354 A1 | 3/2003 | Takemoto et al. | |
| 2005/0091596 A1* | 4/2005 | Anthony et al. | 715/712 |
| 2008/0062141 A1* | 3/2008 | Chandhri | 345/173 |
| 2008/0066016 A1* | 3/2008 | Dowdy et al. | 715/854 |
| 2008/0074490 A1* | 3/2008 | Saishu et al. | 348/51 |
| 2011/0193881 A1* | 8/2011 | Rydenhag | 345/647 |

FOREIGN PATENT DOCUMENTS

| | | |
|---|---|---|
| JP | 2005-142957 A | 6/2005 |
| JP | 2006-80626 A | 3/2006 |
| JP | 2007-072269 A | 3/2007 |

OTHER PUBLICATIONS

Extended Search Report dated Feb. 18, 2011 for European Application No. 09004479.3.

\* cited by examiner

*Primary Examiner* — Liangche A Wang
(74) *Attorney, Agent, or Firm* — Birch, Stewart, Kolasch & Birch, LLP

(57) ABSTRACT

A stereoscopic image generating apparatus is constituted by: an image obtaining section, for obtaining a plurality of image groups, each constituted by a plurality of images for generating stereoscopic images and obtained by photography of subjects from different viewpoints; and an image layout section, for generating a stereoscopic layout image, in which a single image group selected from among the plurality of image groups as an image of interest is arranged at a predetermined position on a display screen in a stereoscopically viewable manner, and selected images from among the image groups other than the single image group are arranged such that they appear to be inclined and facing toward the predetermined position on the display screen at at least one of the right and left sides of the predetermined position.

13 Claims, 17 Drawing Sheets

|    | AL3 | AL2 | AL1 | A0 | AR1 | AR2 | AR3 |
|----|-----|-----|-----|----|-----|-----|-----|
| G1 | S3  | S3  | S3  | S1 | S3  | S3  | S3  |
| G2 | S3  | S3  | S3  | S2 | S3  | S3  | S3  |
| G3 | S3  | S3  | S3  | S3 | S3  | S3  | S3  |
| G4 | S3  | S3  | S3  | S4 | S3  | S3  | S3  |
| G5 | S3  | S3  | S3  | S5 | S3  | S3  | S3  |
| G6 | S3  | S3  | S3  | S6 | S3  | S3  | S3  |

|    | AL3 | AL2 | AL1 | A0 | AR1 | AR2 | AR3 |
|----|-----|-----|-----|----|-----|-----|-----|
| G1 | S4  | S4  | S4  | S1 | S3  | S3  | S3  |
| G2 | S4  | S4  | S4  | S2 | S3  | S3  | S3  |
| G3 | S4  | S4  | S4  | S3 | S3  | S3  | S3  |
| G4 | S4  | S4  | S4  | S4 | S3  | S3  | S3  |
| G5 | S4  | S4  | S4  | S5 | S3  | S3  | S3  |
| G6 | S4  | S4  | S4  | S6 | S3  | S3  | S3  |

FIG.15

|  | AL3 | AL2 | AL1 | A0 | AR1 | AR2 | AR3 |
|---|---|---|---|---|---|---|---|
| G1 | S6 | S5 | S4 | S1 | S3 | S2 | S1 |
| G2 | S6 | S5 | S4 | S2 | S3 | S2 | S1 |
| G3 | S6 | S5 | S4 | S3 | S3 | S2 | S1 |
| G4 | S6 | S5 | S4 | S4 | S3 | S2 | S1 |
| G5 | S6 | S5 | S4 | S5 | S3 | S2 | S1 |
| G6 | S6 | S5 | S4 | S6 | S3 | S2 | S1 |

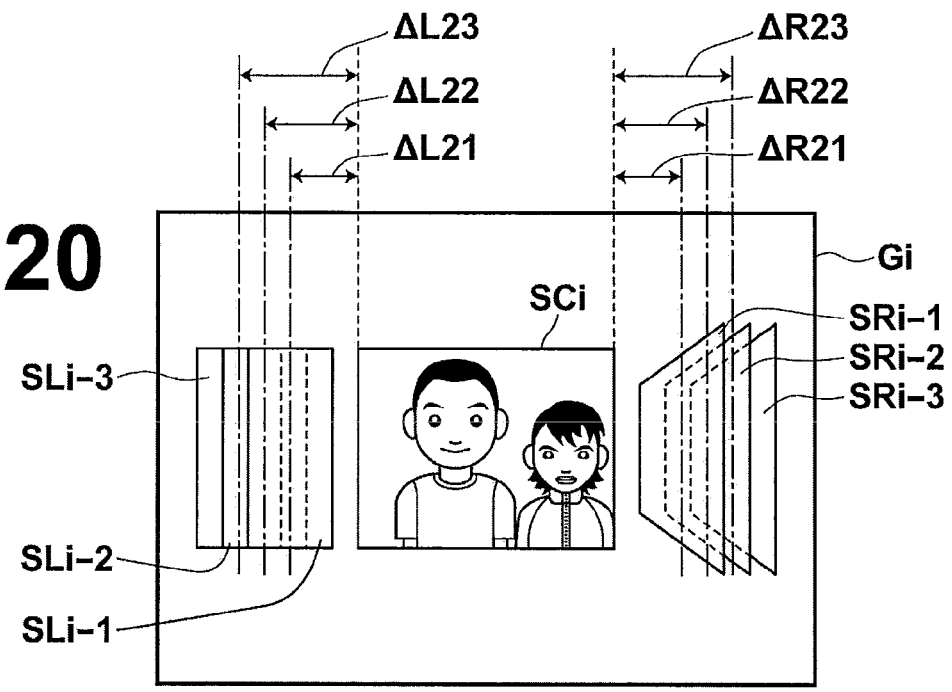
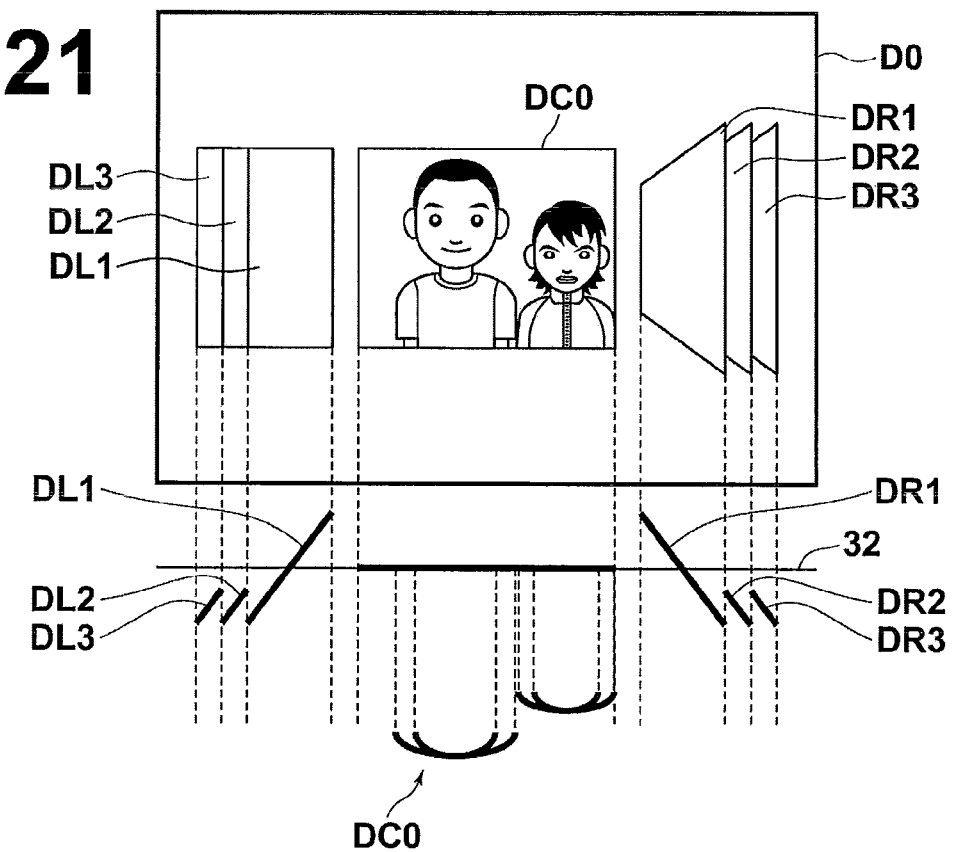

METHOD, APPARATUS, AND PROGRAM FOR GENERATING A STEREOSCOPIC LAYOUT IMAGE FROM A PLURALITY OF LAYOUT IMAGES

BACKGROUND OF THE INVENTION

1. Field of the Invention

The present invention is related to a stereoscopic image generating method and a stereoscopic image generating apparatus, for generating stereoscopic images in which a plurality of images are laid out. The present invention is also related to a program that causes a computer to execute the stereoscopic image generating method.

2. Description of the Related Art

It is known that stereoscopic viewing that utilizes parallax is enabled by combining and displaying a plurality of images. Stereoscopic images that enable stereoscopic viewing may be generated by obtaining a plurality of images of a single subject using a plurality of cameras at different positions, then combining a plurality of images utilizing the parallax of the subject included in the plurality of images.

Specifically, stereoscopic images may be generated by causing colors in the plurality of images to be different, such as red and blue, then overlapping the images. Alternatively, stereoscopic images may be generated by causing the polarization directions to be different within the plurality of images, then overlapping the images. In these cases, stereoscopic images can be viewed three dimensionally, by viewers' eyes stereoscopically viewing the stereoscopic images, which are displayed using red/blue glasses or polarizing glasses, using the automatic focusing function of the eyes (the anaglyph method and the polarizing filter method).

It is also possible to view stereoscopic images three dimensionally without using polarizing glasses and the like. The parallax barrier method and the lenticular method enable stereoscopic images to be viewed three dimensionally, by displaying the stereoscopic images on a three dimensional liquid crystal display. In these cases, the stereoscopic images are generated by cutting the plurality of images into vertically extending stripes, which are then arranged alternately. Another example of a stereoscopic display method is the time division method, in which the light beam directions of left and right images are changed by the use of image separating glasses or by attaching optical elements to liquid crystal displays, and displaying the right and left images alternately.

A technique has been proposed in which stereoscopic images, which are viewable three dimensionally, and planar images, which are not viewable three dimensionally, are alternately switched and displayed during three dimensional display using the parallax barrier method (refer to Japanese Unexamined Patent Publication No. 2007-072269). Further, a technique has been proposed for three dimensionally displaying textures, by obtaining stereoscopic values that represent degrees of spatial effect, and performing pseudo three dimensional display by moving pixels of texture data according to the stereoscopic values (refer to U.S. Pat. No. 6,078,334).

A technique has been proposed for arranging and displaying CD booklet covers with perspective (CoverFlow by Apple Computer, Inc.). As illustrated in FIG. 26, the CoverFlow technique arranges a central image of interest such that it faces forward, and arranges other images such that they appear to be inclined toward the image of interest from the left and right thereof, by drawing the other images using the law of perspective. When one of the other images, which are arranged toward the left and the right of the image of interest, is selected, the selected image is displayed at the center facing forward, as the image of interest.

The CoverFlow technique draws images based on the law of perspective. Therefore, the image imparts perspective, but cannot be viewed three dimensionally, as a stereoscopic image.

SUMMARY OF THE INVENTION

The present invention has been developed in view of the foregoing circumstances. It is an object of the present invention to enable a plurality of images to be viewed stereoscopically, when laid out in a manner similar to CoverFlow.

A stereoscopic image generating apparatus of the present invention is characterized by comprising:

image obtaining means, for obtaining a plurality of image groups, each constituted by a plurality of images for generating stereoscopic images and obtained by photography of subjects from different viewpoints; and image layout means, for generating a stereoscopic layout image, in which a single image group selected from among the plurality of image groups as an image of interest is arranged at a predetermined position on a display screen in a stereoscopically viewable manner, and selected images from among the image groups other than the single image group are arranged such that they appear to be inclined and facing toward the predetermined position on the display screen at at least one of the right and left sides of the predetermined position.

By displaying the stereoscopic layout image which has been generated in this manner such that it is viewable three dimensionally, the image of interest as well as the images arranged at at least one of the right and left sides of the image of interest will appear three dimensionally. Accordingly, three dimensional viewing of a plurality of images which are laid out in the same manner as CoverFlow is enabled.

Note that in the stereoscopic image generating apparatus of the present invention, a configuration may be adopted, wherein:

the image layout means selects images which are obtained by photography at central photography positions and at photography positions in the vicinities of central photography positions as the selected images, from among the images included in the image groups other than the single image group.

Here, in the case that a subject is photographed from a plurality of photography positions, the subject faces substantially forward in images which are obtained by photography from photography positions at the center or the vicinity thereof. Therefore, these images show the subject most clearly. Accordingly, what the subject is can be clearly understood by selecting images which are obtained at photography positions in the vicinities of central photography positions as the selected images, even if the selected images appear to be inclined.

In the stereoscopic image generating apparatus of the present invention, a configuration may be adopted, wherein:

the image layout means selects images which are obtained by photography at rightward photography positions as the selected images to be arranged at the left side of the predetermined position, and selects images which are obtained by photography at leftward photography positions as the selected images to be arranged at the right side of the predetermined position, from among the images included in the image groups other than the single image group.

In the case that three dimensional viewing is performed, images which are displayed toward the left are visually perceived by the right eye, and images which are displayed toward the right are visually perceived by the left eye. For this reason, the selected images can be viewed three dimensionally in a natural manner, by selecting images which are obtained by photography at rightward photography positions as the selected images to be arranged at the left side of the predetermined position, and selecting images which are obtained by photography at leftward photography positions as the selected images to be arranged at the right side of the predetermined position.

In the stereoscopic image generating apparatus of the present invention, a configuration may be adopted, wherein: the image layout means selects images which are obtained by photography at central photography positions and at photography positions in the vicinities of central photography positions as the selected images to be arranged closer to the predetermined position, and selects images which are obtained by photography at positions farther from the central photography positions as the positions at which the selected images are to be arranged becomes farther from the predetermined position, from among the images included in the image groups other than the single image group.

Three dimensional viewing can be performed most naturally if the images arranged toward the edges of the display screen are those in which the subject is viewed from afar. For this reason, the selected images can be viewed three dimensionally in a natural manner, by selecting images which are obtained by photography at central photography positions and at photography positions in the vicinities of central photography positions as the selected images to be arranged closer to the predetermined position, and selecting images which are obtained by photography at positions farther from the central photography positions as the positions at which the selected images are to be arranged becomes farther from the predetermined position.

In the stereoscopic image generating apparatus of the present invention, a configuration may be adopted, wherein the image layout means comprises:

first layout means, for arranging a plurality of images of interest, which are included in the selected single image group, at the predetermined position within a plurality of layout images;

second layout means, for reducing the selected images in the width directions thereof at different reduction rates to generate a plurality of reduced selected images, and arranging the plurality of reduced selected images, using a predetermined reference position at at least one of the right and left sides of the predetermined position within the plurality of layout images as references; and stereoscopic converting means, for generating the stereoscopic layout image from the plurality of layout images, in which the plurality of images of interest and the plurality of reduced selected images are arranged.

In this case, the selected images can be arranged to appear inclined facing the predetermined position, without performing complex calculations.

In the stereoscopic image generating apparatus of the present invention, a configuration may be adopted, wherein: the second layout means matches the edges of the plurality of reduced selected images toward the side of the predetermined position with the reference positions within the plurality of layout images, and arranges the plurality of reduced selected images within each of the plurality of layout images.

In this case, the edges of the selected images toward the side of the predetermined position are matched with the reference plane of the spatial effect of the image of interest. Therefore, when the stereoscopic layout image is viewed three dimensionally, the selected images can be viewed three dimensionally such that they appear to be inclined in front of the image of interest. Accordingly, the range of parallax when viewing the stereoscopic layout image becomes substantially the same for all images included in the stereoscopic layout image, and fatigue during stereoscopic viewing can be reduced.

In the stereoscopic image generating apparatus of the present invention, a configuration may be adopted, wherein: the second layout means matches the edges of the plurality of reduced selected images at the side opposite the side toward the predetermined position with the reference positions within the plurality of layout images, and arranges the plurality of reduced selected images within each of the plurality of layout images.

In this case, the edges of the selected images opposite the side of the predetermined position are matched with the reference plane of the spatial effect of the image of interest. Therefore, when the stereoscopic layout image is viewed three dimensionally, the selected images can be viewed three dimensionally such that they appear to be inclined at positions further away than the image of interest. Accordingly, the image of interest and the selected images can be easily distinguished.

In the stereoscopic image generating apparatus of the present invention, a configuration may be adopted, wherein: the second layout means matches portions other than the edges of the plurality of reduced selected images with the reference positions within the plurality of layout images, and arranges the plurality of reduced selected images within each of the plurality of layout images.

In this case, portions other than the edges of the plurality of reduced selected images are matched with the reference plane of spatial effect of the image of interest. Therefore, when the stereoscopic layout image is viewed three dimensionally, the sides of the selected images toward the edges opposite the image of interest appear to be inclined in front of the image of interest, and the sides of the selected images toward the edges toward the image of interest appear to be inclined behind the image of interest. Accordingly, the range of parallax when viewing the stereoscopic layout image does not become large, and further, the image of interest and the selected images can be easily distinguished.

In the stereoscopic image generating apparatus of the present invention, a configuration may be adopted, wherein: the second layout means generates the plurality of reduced selected images at the same reduction rate for selected images to be arranged within each of the layout images, when arranging the plurality of selected images within the layout images.

In this case, the plurality of selected images will appear three dimensionally as inclined images which are parallel to each other.

In the stereoscopic image generating apparatus of the present invention, a configuration may be adopted, wherein: the second layout means generates the plurality of reduced selected images at a greater reduction rate for selected images to be arranged farther away from the predetermined position, when arranging the plurality of selected images within the layout images.

In this case, the plurality of selected images will appear three dimensionally such that the inclinations thereof become greater at positions farther away from the predetermined position.

In the stereoscopic image generating apparatus of the present invention, a configuration may be adopted, wherein: the second layout means sets the reduction rate of the selected images such that the parallax therein becomes less than or equal to the parallax of the plurality of images of interest within the selected single image group.

In this case, the selected images can be prevented from becoming more prominent than the image of interest.

A stereoscopic image generating method of the present invention is characterized by comprising the steps of:

obtaining a plurality of image groups, each constituted by a plurality of images for generating stereoscopic images and obtained by photography of subjects from different viewpoints; and generating a stereoscopic layout image, in which a single image group selected from among the plurality of image groups as an image of interest is arranged at a predetermined position on a display screen in a stereoscopically viewable manner, and selected images from among the image groups other than the single image group are arranged such that they appear to be inclined and facing toward the predetermined position on the display screen at at least one of the right and left sides of the predetermined position.

The stereoscopic image generating method according to the present invention may be provided as a program that causes a computer to execute the method.

Note that the program according to the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

BRIEF DESCRIPTION OF THE DRAWINGS

FIG. 15 is a diagram that illustrates the selection results of images to be arranged by a stereoscopic image generating apparatus according to a third embodiment of the present invention.

FIG. 20 is a diagram that illustrates a layout image generated by the stereoscopic image generating apparatus of the fifth embodiment.

FIG. 21 is a diagram that schematically illustrates a stereoscopic layout image generated by the stereoscopic image generating apparatus of the fifth embodiment, and the spatial effect which are perceived when the stereoscopic layout image is viewed stereoscopically.

BEST MODE FOR CARRYING OUT THE INVENTION

Figure 1:
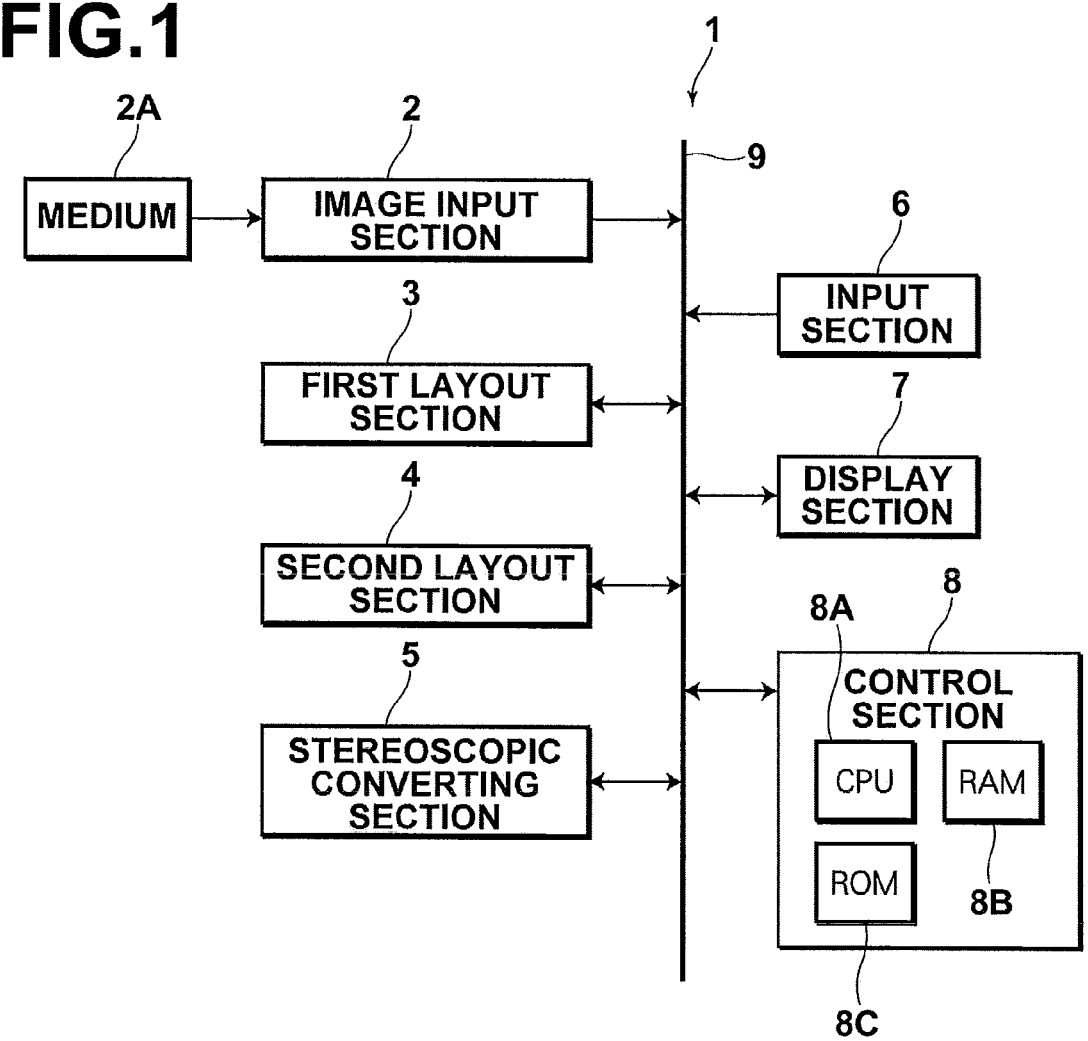
FIG. 1 is a block diagram that illustrates the schematic construction of a stereoscopic image generating apparatus according to a first embodiment of the present invention.

Hereinafter, embodiments of the present invention will be described with reference to the attached drawings. FIG. 1 is a block diagram that illustrates the schematic construction of a stereoscopic image generating apparatus 1 according to a first embodiment of the present invention. As illustrated in FIG. 1, the stereoscopic image generating apparatus 1 is an apparatus that generates stereoscopic layout images which are capable of being viewed three dimensionally. The stereoscopic image generating apparatus is equipped with: an image input section 2; a first layout section 3; a second layout section 4; a stereoscopic converting section 5; an input section 6 constituted by a keyboard, a mouse, and the like, for performing various input operations; a display section 7 such as a liquid crystal display monitor, for performing various types of display; and a control section 8. The components listed above are connected by a bus 9. Note that in the first embodiment, the display section 7 performs three dimensional display using the parallax barrier method. Therefore, thin vertically extending slits are formed in a display screen thereof.

Note that the first layout section 3, the second layout section 4, and the stereoscopic converting section 5 constitute the image layout means.

The image input section 2 inputs image files, in which a plurality of images for generating stereoscopic images are recorded, to the stereoscopic image generating apparatus 1. Known means, such as media drives that readout image files from media, wired or wireless interfaces that receive input of image files via networks, and the like may be employed as the image input section 2. In the present embodiment, the image input section 2 is configured to read out image files from a medium 2A. Note that the image files are compressed into formats such as JPEG. Therefore, the image input section 2 decompresses the input image files, and provides the decompressed image files to the stereoscopic image generating apparatus 1 for further processing.

Figure 2:
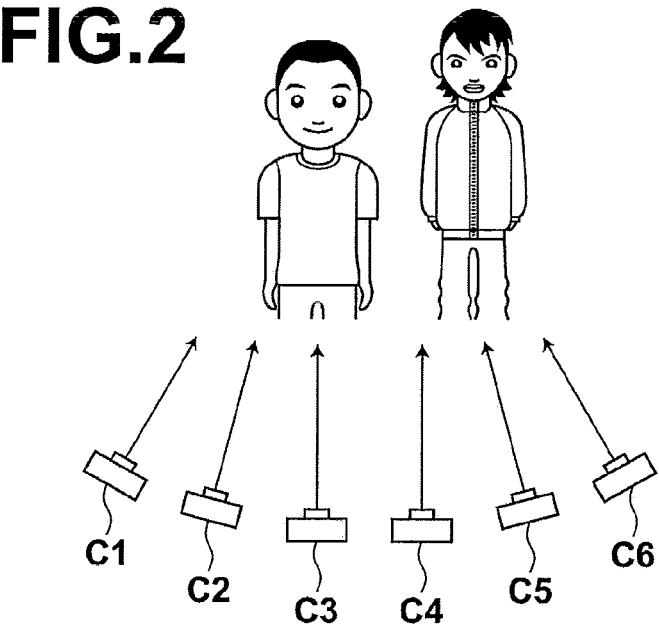
FIG. 2 is a diagram that illustrates relationships among photography positions and a subject.
Figure 3:
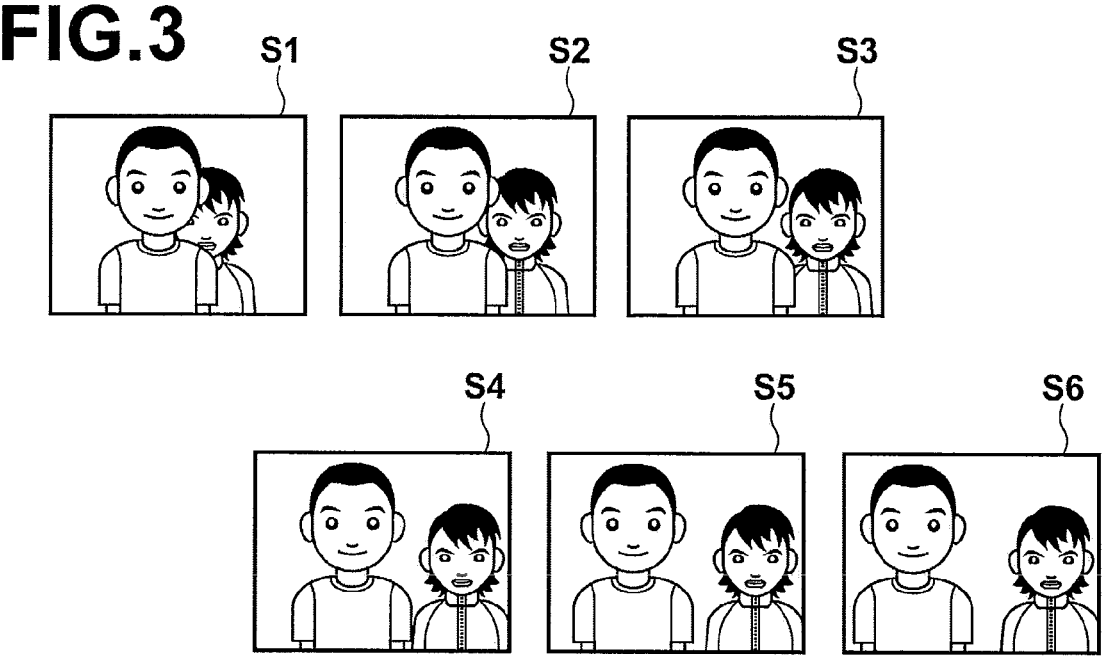
FIG. 3 is a diagram that illustrates six images obtained by six cameras C1 through C6 of FIG. 2.

Here, the plurality of images for generating a single stereoscopic image are obtained by cameras C1 through C6 which are provided at a plurality (six in the first embodiment) of photography positions at equidistant intervals from each other, as illustrated in FIG. 2. Six images S1 through S6, each of which are obtained by the six cameras C1 through C6 of FIG. 2, are illustrated in FIG. 3. As illustrated in FIG. 3, the subjects included in the six images S1 through S6 have parallax corresponding to the photography positions from which the images were obtained.

Note that in the first embodiment, the stereoscopic image generating apparatus 1 generates six layout images G1 through G6, corresponding to the six images S1 through S6, respectively. Then, the stereoscopic image generating apparatus 1 generates a stereoscopic layout image D0, which is capable of being viewed three dimensionally from five viewing positions P1 through P5, from the six layout images G1 through G6.

Figure 4:
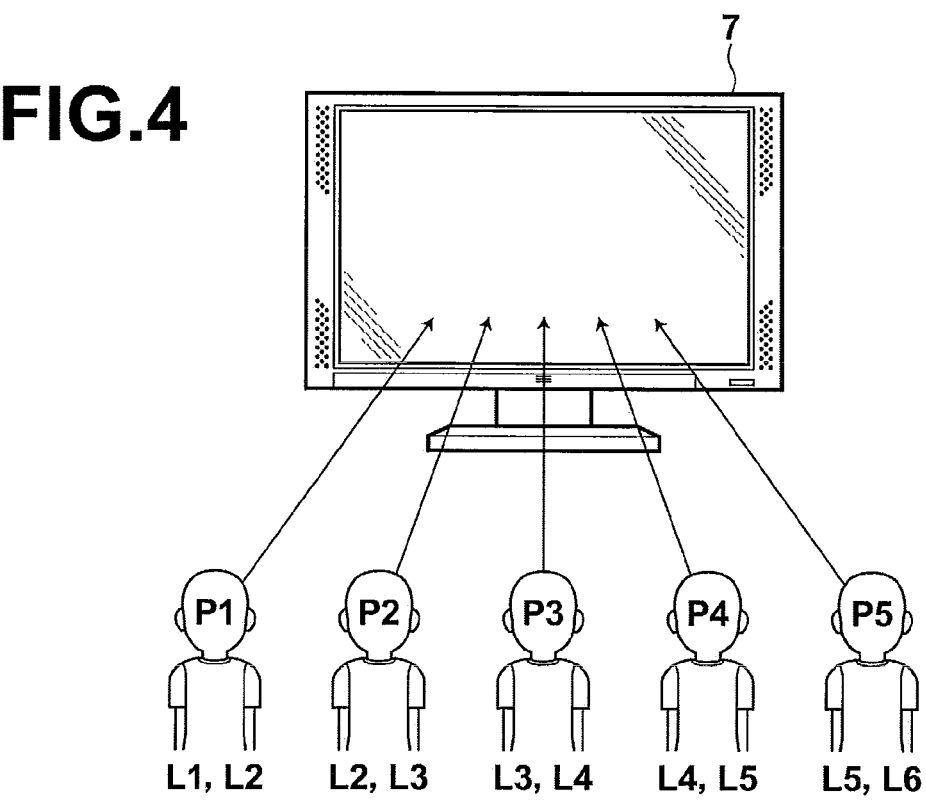
FIG. 4 is a diagram that illustrates relationships among a display section and viewing positions.

Note that the slits of the display section 7 are formed such that in the case that the stereoscopic layout image D0 is displayed and viewed from the viewing positions P1 through P5 illustrated in FIG. 4, the layout images G1 and G2 are viewable from the first viewing position P1, the layout images G2 and G3 are viewable from the second viewing position P2, the layout images G3 and G4 are viewable from the third viewing position P3, the layout images G4 and G5 are viewable from the fourth viewing position P4, and the layout images G5 and G6 are viewable from the fifth viewing position P5.

Here, three dimensional viewing is enabled at the viewing positions P1 through P5, by the two images which are arranged next to each other which are viewable from each of the positions. Accordingly, the layout image G1 is a leftward image at the first viewing position P1, and the layout image G2 is a rightward image at the first viewing position P1 and a leftward image at the second viewing position P2. The layout image G3 is a rightward image at the second viewing position P2 and a leftward image at the third viewing position P3. The layout image G4 is a rightward image at the third viewing position P3 and a leftward image at the fourth viewing position P4. The layout image G5 is a rightward image at the fourth viewing position P4 and a leftward image at the fifth viewing position P5, and the layout image G6 is a rightward image at the fifth viewing position P5.

Hereinafter, generation of the layout images G1 through G6 will be described. First, the steps of a process performed by the first layout section 3 will be described. In the first embodiment, seven images are arranged at each of the layout images G1 through G6. Six images S1 through S6 for generating stereoscopic images are prepared as images of a single subject. Therefore, seven image groups F1 through F7 for seven subjects, each including six images S1 through S6, are input to the stereoscopic image generating apparatus 1.

Figures 5, 6:
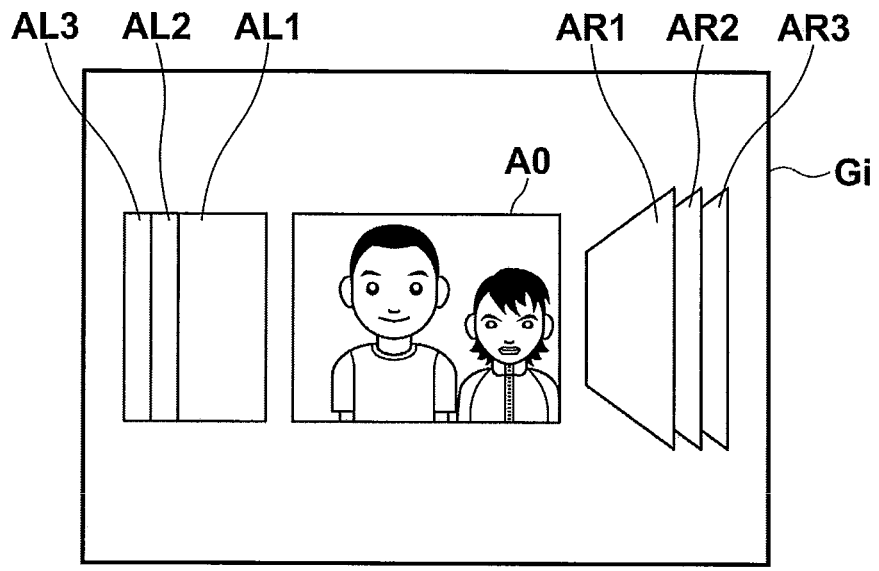
FIG. 5 is a diagram that illustrates an example of how images are arranged within a layout image.
FIG. 6 illustrates an example of selection results of positions in which images are to be arranged by the stereoscopic image generating apparatus of the first embodiment.

FIG. 5 is a diagram that illustrates an example of how images are arranged within a layout image. As illustrated in FIG. 5, a layout image Gi (i is an integer from 1 through 6) includes: a image of interest arranging position A0 at the approximate center thereof, at which an image of interest is arranged; left side image arranging positions AL1 through AL3 toward the left of the image of interest arranging position A0, at which three images are arranged; and right side image arranging positions AR1 through AR3 toward the right of the image of interest arranging position A0, at which three images are arranged. Note that FIG. 5 illustrates a state in which images are arranged at each of the arranging positions. Here, the images arranged at the right side image arranging positions AR1 through AR3 are arranged with perspective such that they appear as though their outer edges are inclined toward the viewer. Alternatively, the images arranged at the right side image arranging positions AR1 through AR3 may be arranged without perspective, in the same manner as the images arranged at the left side image arranging positions AL1 through AL3. As a further alternative, the images arranged at the left side image arranging positions AL1 through AL3 may be arranged with perspective, in the same manner as the images arranged at the right side image arranging positions AR1 through AR3.

Note that the sizes of the image of interest which are arranged at the image of interest arranging position A0 of each of the layout images G1 through G6 are the same. However, the sizes of the images which are arranged at the right side image arranging positions AR1 through AR3 and the left side image arranging positions AL1 through AL3 differ in the width direction in each of the layout images G1 through G6.

First, the first layout section 3 selects which of the six images S1 through S6 included in each of the image groups F1 through F7 are to be arranged at each of the positions A0, AR1 through AR3, and AL1 through AL3. FIG. 6 illustrates an example of selection results of positions in which images are to be arranged. As illustrated in FIG. 6, the images S1 through S6 are selected as the image to be arranged at the image of interest arranging position in each of the layout images G1 through G6, respectively. In addition, the image S3, which is obtained by photography by the camera C3 at a photography position close to the center, is selected as the image to be arranged at the right side image arranging positions AR1 through AR3 and the left side image arranging positions AL1 through AL3. Note that the image S4, which is obtained by the camera C4, may be substituted for the image S3.

Figure 7:
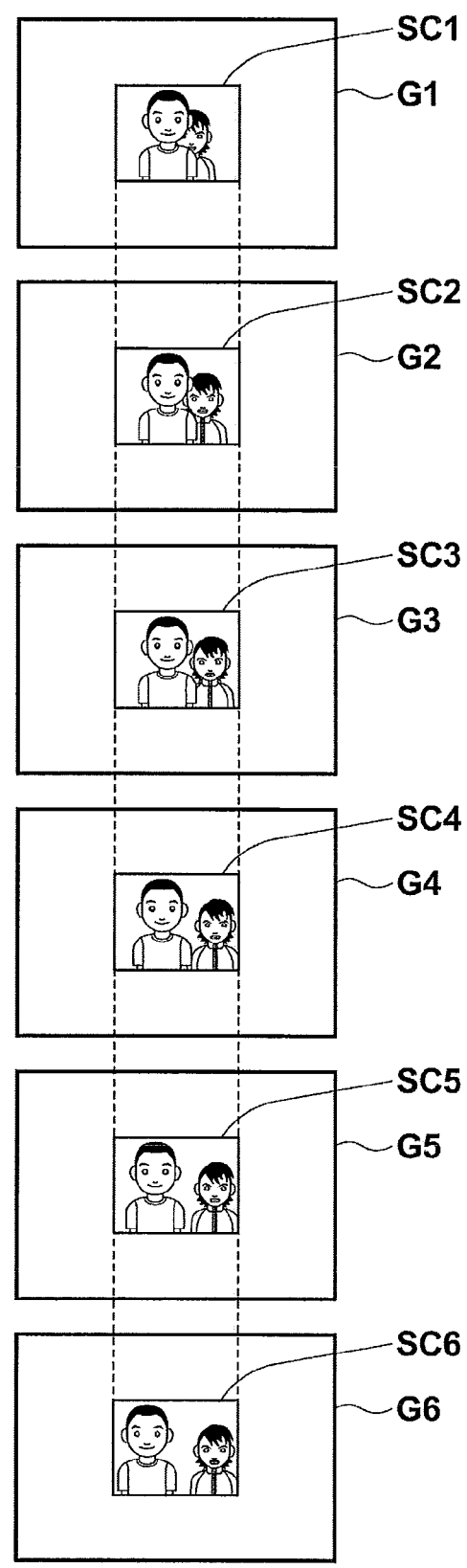
FIG. 7 is a diagram that illustrates layout images, in which reduced images of interest are arranged.

The first layout section 3 reduces the images of interest to be arranged at the image of interest arranging positions A0 in the height directions and the width directions thereof at a magnification rate of a ($a=w0/w$, $w0$ is the width of a predetermined size, w is the width of the image of interest, and 0<a<1) such that they become a predetermined size, to generate reduced images of interest SC1 through SC6. The reduced images of interest SC1 through SC6 are arranged at the image of interest arranging position A0 of each of the layout images G1 through G6, respectively. FIG. 7 is a diagram that illustrates the layout images G1 through G6, in which the reduced images of interest SC1 through SC6 are arranged.

Next, the second layout section 4 selects images from among the image groups other than the image of interest image group, and arranges them in the left side image arranging positions AL1 through AL3 and the right side image arranging positions AR1 through AR3. Here, in the case that the targets of arrangement are the selected images included in image groups to be arranged at the left side image arranging positions AL1 through AL3, the second layout section 4 reduces the selected images in the height direction at the same magnification rate a as is used to reduce the image of interest, and reduces the selected images in the width direction at six different magnification rates b1 through b6, to generate reduced selected images SL1-1 through SL6-1. Note that the magnification rates bi (i is an integer from 1 through 6) are calculated by the formula: $bi=wi/w$. Here, wi is the widths of the reduced selected images SL1 through SL6, and $w1<w2<w3<w4<w5<w6<w0$. In addition, the difference among each of the widths wi are E, which is determined by a maximum parallax Emax of the image of interest. Note that the image of interest is reduced by the magnification rate a. Therefore, $E=a \cdot Emax$. Regarding the parallax Emax, corresponding points within images of interest having sequential reference numbers may be searched for. The differences among the corresponding points in the horizontal direction may be calculated, and the maximum difference may be designated as the parallax Emax.

Figure 8:
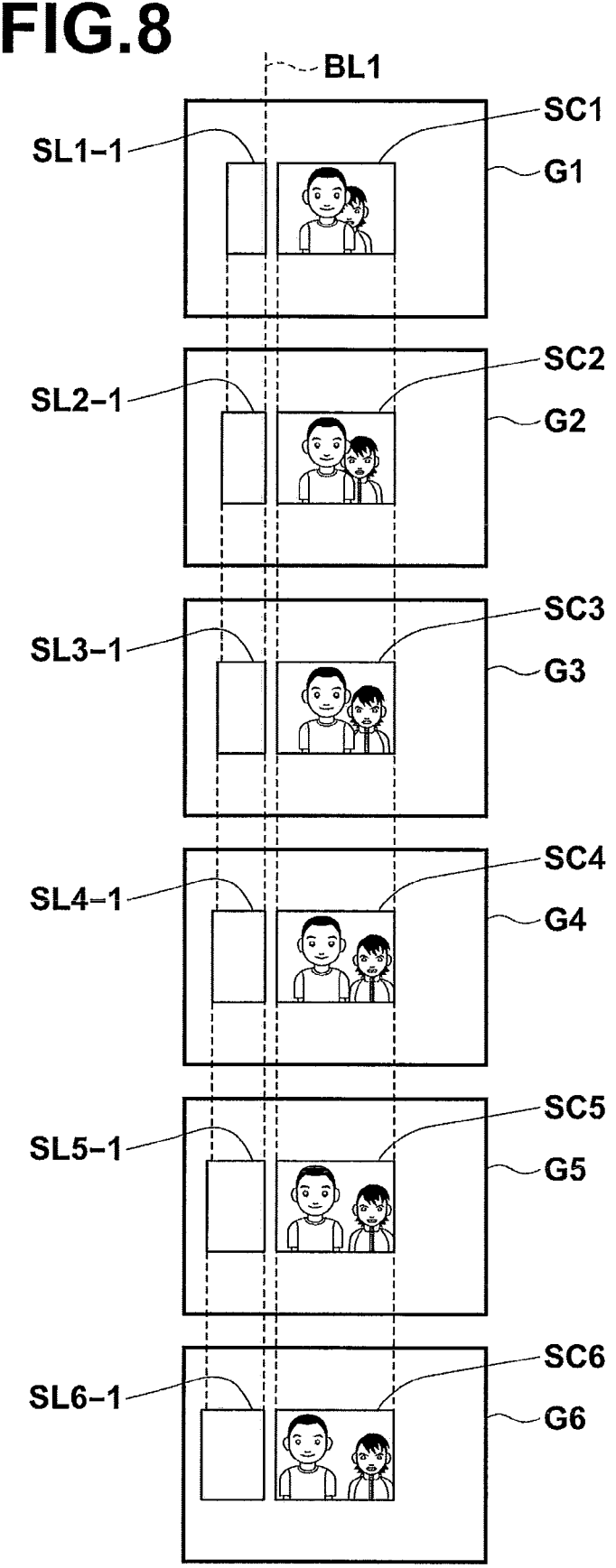
FIG. 8 is a diagram for explaining the arrangement of reduced selected images in left side image arranging positions.

The second layout section 4 arranges the reduced selected images SL1-1 through SL6-1 in the left side image arranging positions AL1 of each of the layout images G1 through G6. FIG. 8 is a diagram for explaining the arrangement of the reduced selected images in the left side image arranging positions AL1. As illustrated in FIG. 8, the reduced selected images SL1-1 through SL6-1 are arranged at the left side image arranging positions AL1 such that the positions of the right edges thereof are matched at a reference position BL1, which is a distance AL1 toward the left from the left edge of the reduced images of interest SC1 through SC6. Accordingly, if the layout images G1 through G6 are compared, the positions of the right edges of the reduced selected images SL1-1 through SL6-1 are the same, but the positions of the left edges thereof progressively protrude toward the left.

The second layout section 4 sequentially generates reduced selected images SL1-2 through SL6-2 and SL1-3 through SL6-3 from images selected from image groups of images to be arranged at the left side image arranging positions AL2 and AL3. Then, the reduced selected images SL1-2 through SL6-2 and SL1-3 through SL6-3 are arranged at the left side image arranging positions AL2 and AL3 of the layout images G1 through G6.

In the case that the targets of arrangement are the selected images included in image groups to be arranged at the right side image arranging positions AR1 through AR3, the second layout section 4 reduces the left edges of the selected images in the height direction at a magnification rate a1 (a1<a), and reduces the right edges of the selected images in the height direction at a magnification rate a2 (a2>a). Regarding the width directions, the six different magnification rates b1 through b6 are used in the opposite order as in the case in which the reduced selected images SL1 through SL6 were generated, to generate reduced selected images SR1-1 through SR6-1, SR1-2 through SR6-2, and SR1-3 through SR6-3. Then, the second layout section arranges the reduced selected images SR1-1 through SR6-1, SR1-2 through SR6-2, and SR1-3 through SR6-3 in the right side image arranging positions AR1 through AR3 of each of the layout images G1 through G6, to generate the layout images G1 through G6, in which images have been arranged.

Figure 9:
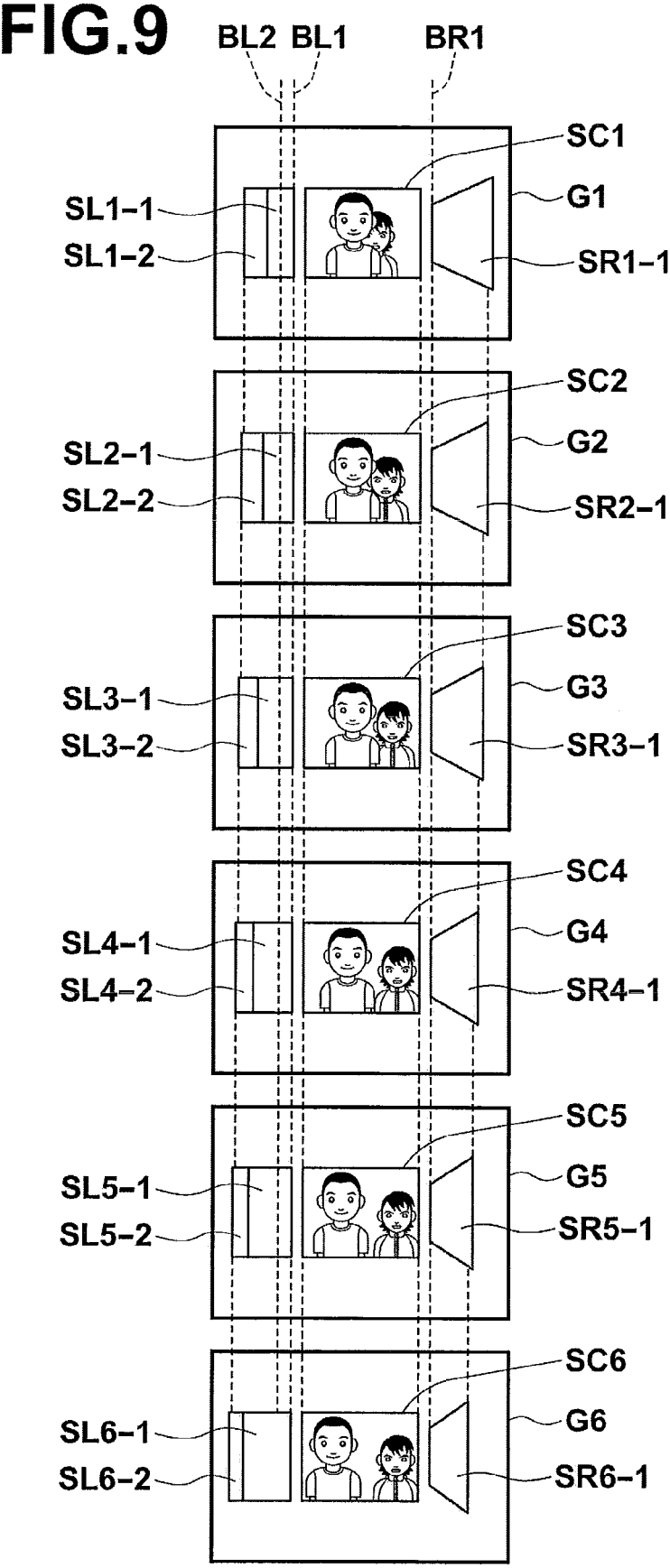
FIG. 9 is a diagram for explaining arrangement of reduced selected images into other image arranging positions.

FIG. 9 is a diagram for explaining arrangement of reduced selected images into other image arranging positions. Note that FIG. 9 shows states in which reduced selected images are arranged at the left side image arranging positions AL1 and AL2 and in the right side image arranging positions AR1. As illustrated in FIG. 9, the reduced selected images SL1-2 through SL6-2 are arranged at the left side image arranging positions AL2 such that the right edges thereof are matched at a reference position BL2, which is a distance AL2 toward the left from the left edge of the reduced images of interest SC1 through SC6. Here, the distance AL2 is twice the distance AL1. Accordingly, if the layout images G1 through G6 are compared, the positions of the right edges of the reduced selected images SL1-2 through SL6-2 which are arranged at the left side image arranging positions AL2 are the same, but the positions of the left edges thereof progressively protrude toward the left. Note that the right sides of the reduced selected images SL1-2 through SL6-2, which are arranged at the left side image arranging positions AL2, are covered by the reduced selected images SL1-1 through SL6-1, which are arranged at the left side image arranging positions AL1.

Although not shown in FIG. 9, reduced selected images SL1-3 through SL6-3 are arranged at the left side image arranging positions AL3 such that the right edges thereof are matched at a reference position BL3, which is a distance AL3 toward the left from the left edge of the reduced images of interest SC1 through SC6. Here, the distance AL3 is three times the distance AL1. Note that the right sides of the reduced selected images SL1-3 through SL6-3, which are arranged at the left side image arranging positions AL3, are covered by the reduced selected images SL1-1 through SL6-1 and the reduced selected images SL1-2 through SL6-2, which are arranged at the left side image arranging positions AL1 and AL2.

In addition, reduced selected images SR1-1 through SR6-1 are arranged at the right side image arranging positions AR1 such that the left edges thereof are matched at a reference position BR1, which is a distance AR1 toward the right from the right edge of the reduced images of interest SC1 through SC6. Accordingly, if the layout images G1 through G6 are compared, the positions of the left edges of the reduced selected images SR1-1 through SR6-1 which are arranged at the right side image arranging positions AR1 are the same, but the right edges thereof progressively become positioned toward the left.

Although not shown in FIG. 9, reduced selected images SR1-2 through SR6-2 and SR1-3 through SR6-3 are arranged at the right side image arranging positions AR2 and AR3 such that the left edges thereof are matched at reference positions BR2 and BR3, which are a distance AR2 and AR3 toward the right from the right edge of the reduced images of interest SC1 through SC6, respectively. Here, the distance AR2 is twice the distance AR1, and the distance AR3 is three times the distance AR1. Note that the left sides of the reduced selected images SR1-2 through SR6-2, which are arranged at the right side image arranging positions AR2, are covered by the reduced selected images SR1-1 through SR6-1, which are arranged at the right side image arranging positions AR1. In addition, the right sides of the reduced selected images SR1-3 through SR6-3, which are arranged at the right side image arranging positions AL3, are covered by the reduced selected images SR1-1 through SR6-1 and the reduced selected images SR1-2 through SR6-2, which are arranged at the right side image arranging positions AR1 and AR2.

Figure 10:
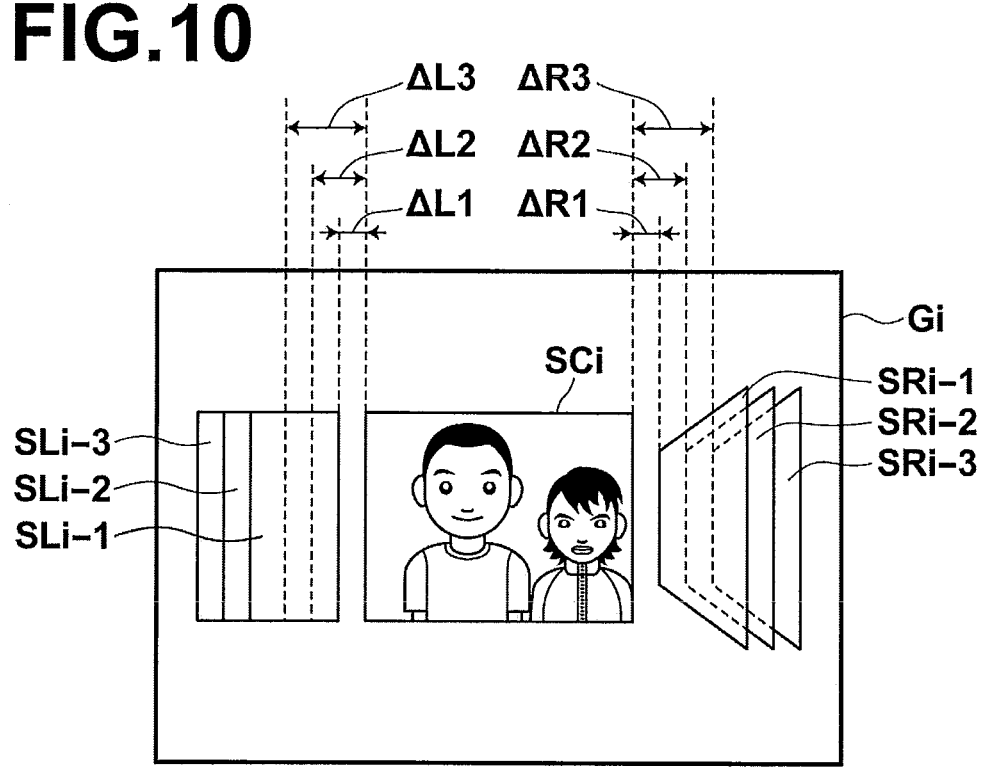
FIG. 10 is a diagram that illustrates a layout image generated by the stereoscopic image generating apparatus of the first embodiment.

FIG. 10 is a diagram that illustrates a layout image generated by the stereoscopic image generating apparatus 1 of the first embodiment. As illustrated in FIG. 10, a reduced image of interest SCi is arranged at the center of a layout image Gi (i is an integer from 1 through 6). Reduced selected images SLi-1, SLi-2, and SLi-3 are arranged with their right edges matched at positions which are distances of AL1, AL2, and AL3 away from the left edge of the reduced image-of interest SCi, respectively. Reduced selected images SRi-1, SRi-2, and SRi-3 are arranged with their left edges matched at positions which are distances of ΔR1, ΔR2, and ΔR3 away from the right edge of the reduced image of interest SCi, respectively.

Figure 11:
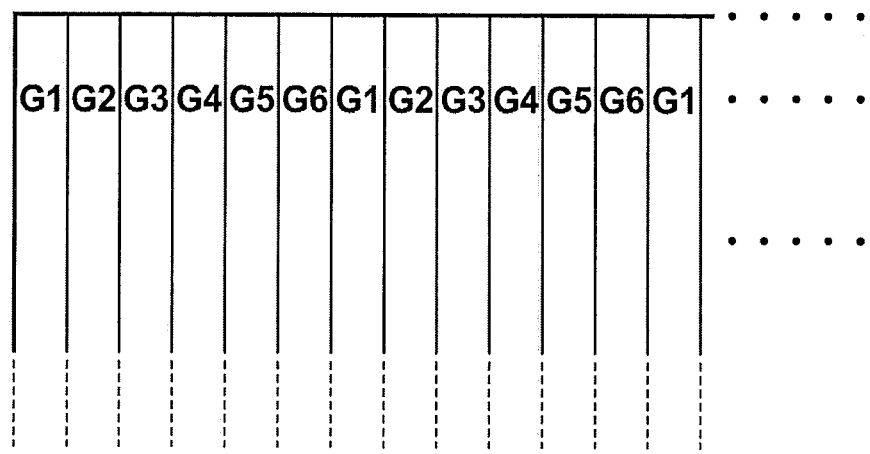
FIG. 11 is a diagram for explaining generation of a stereoscopic layout image.

The stereoscopic converting section 5 cuts the six generated layout images G1 through G6 into vertical strips, and generates the stereoscopic layout image D0, by arranging the cut layout images G1 through G6 alternately as G1, G2, . . . G5, G6, G1, G2, . . . as illustrated in FIG. 11. Note that FIG. 11 schematically illustrates the arrangements of the layout images G1 through G6 in the stereoscopic layout image D0, and does not reflect the actual aspect ratios in the stereoscopic layout image D0.

The control section 8 is equipped with: a CPU 8A; a RAM 8B, which functions as a workspace during execution of processes; and a ROM 8C, in which programs for operating the stereoscopic image generating apparatus 1 are recorded. The control section 8 functions to control the operations of the components of the stereoscopic image generating apparatus 1.

Figure 12:
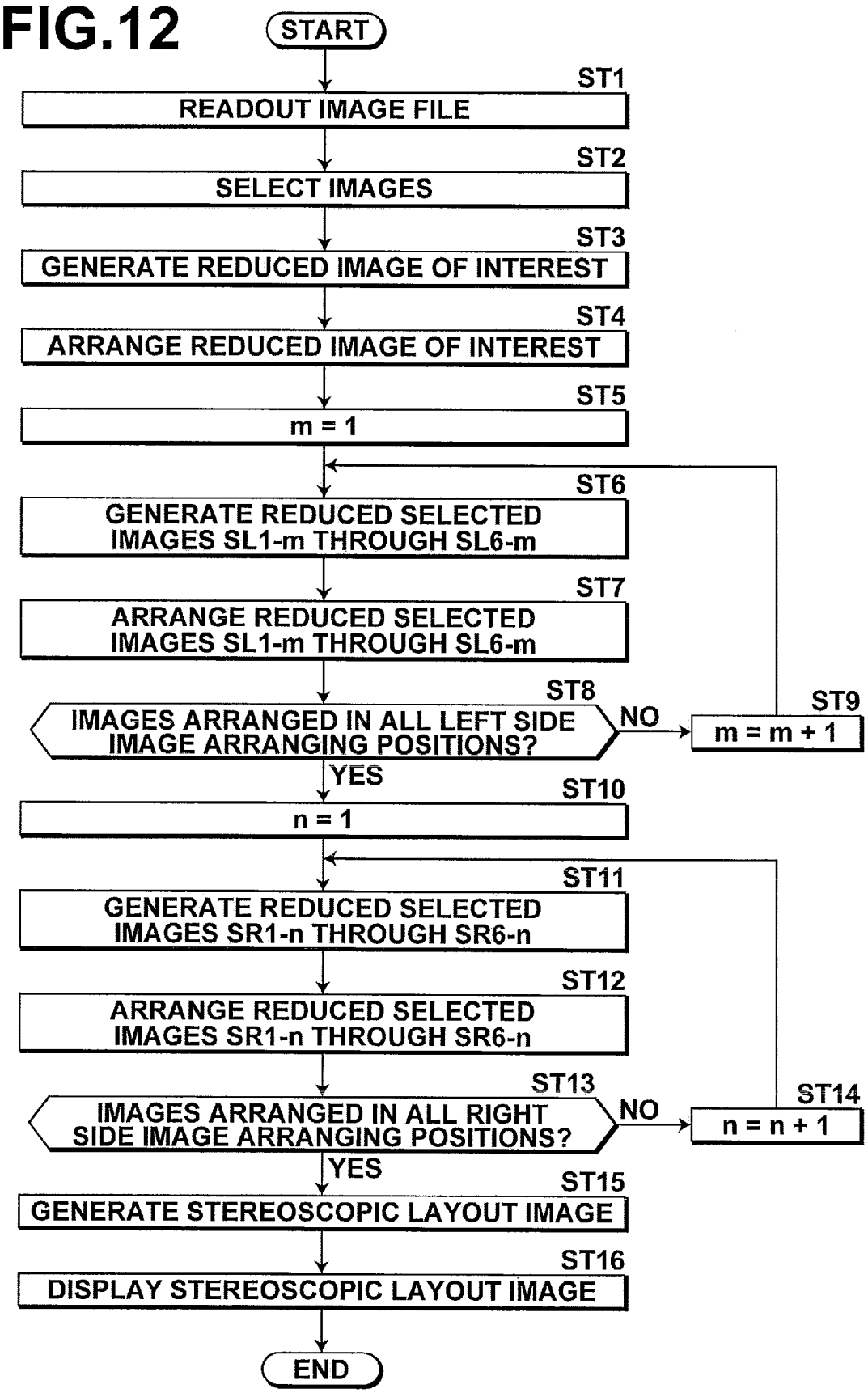
FIG. 12 is a flow chart that illustrates the steps of the process performed by the stereoscopic image generating apparatus of the first embodiment.

Next, the process performed by the stereoscopic image generating apparatus 1 of the first embodiment will be described. FIG. 12 is a flow chart that illustrates the steps of the process performed by the stereoscopic image generating apparatus of the first embodiment. Note that in the first embodiment, images from among seven image groups F1 through F7 are arranged within the layout images G1 through G6. However, a case will be described in which image groups corresponding to each image arranging position are determined in advance, in order to simplify the description. Here, it goes without saying that the image of interest A0, the images to be arranged at the left side image arranging positions AL1 through AL3, and the images to be arranged at the right side image arranging positions AR1 through AR3 can be sequentially selected.

The control section 8 initiates the process by a command to generate a stereoscopic layout image D0 being input via the input section 6. First, image files corresponding to the seven image groups F1 through F7 to be utilized in the generation of the stereoscopic layout image D0 are read out from the medium 2A (step ST2, READ OUT IMAGE FILE). Next, the first layout section 3 selects images from among the images S1 through S6 included in the image groups F1 through F7 to be arranged at the image of interest arranging position A0, the left side image arranging positions AL1 through AL3, and the right side image arranging positions AR1 through AR3 of each of the layout images G1 through G6 (step ST2, SELECT IMAGES).

Next, the first layout section 3 generates reduced images of interest SC1 through SC6, which are reduced images of the images S1 through S6 included in the image group of the images of interest (step ST3). Then, the first layout section 3 arranges the reduced images of interest SC1 through SC6 in the image of interest positions A0 of the layout images G1 through G6 (step ST4).

Next, the control section 8 sets the positions in which images are to be arranged to the first left side image arranging position ALm (m is an integer from 1 through 3, step ST5, m=1). The second layout section 4 generates reduced selected images SL1-$m$ through SL6-$m$, from selected images included in the image group of the images to be arranged at the left side image arranging positions ALm (step ST6). Then, the second layout section 4 arranges the reduced selected images SL1-$m$ through SL6-$m$ in the left side image arranging positions ALm of the layout images G1 through G6 (step ST7). Next, the control section 8 judges whether images have been arranged at all of the left side image arranging positions ALm (step ST8). In the case that the result of judgment in step ST8 is negative, the positions in which images are to be arranged are changed (step ST9, m=m+1), and the process returns to step ST6.

On the other hand, in the case that the result of judgment in step ST8 is affirmative, the control section 8 sets the positions in which images are to be arranged to the first right side image arranging position ARn (n is an integer from 1 through 3, step ST10, n=1). The second layout section 4 generates reduced selected images SR1-$m$ through SR6-$m$, from selected images included in the image group of the images to be arranged at the right side image arranging positions ARm (step ST11). Then, the second layout section 4 arranges the reduced selected images SR1-$m$ through SR6-$m$ in the right side image arranging positions ARm of the layout images G1 through G6 (step ST12). Next, the control section 8 judges whether images have been arranged at all of the right side image arranging positions ARm (step ST13). In the case that the result of judgment in step ST13 is negative, the positions in which images are to be arranged are changed (step ST14, n=n+1), and the process returns to step ST11.

In the case that the result of judgment in step ST13 is affirmative, the stereoscopic converting section 5 generates the stereoscopic layout image D0 from the layout images G1 through G6 (step ST15). Further, the control section 8 causes the stereoscopic layout image D0 to be displayed by the display section 7 (step ST16), and the process ends.

Figures 13, 14:
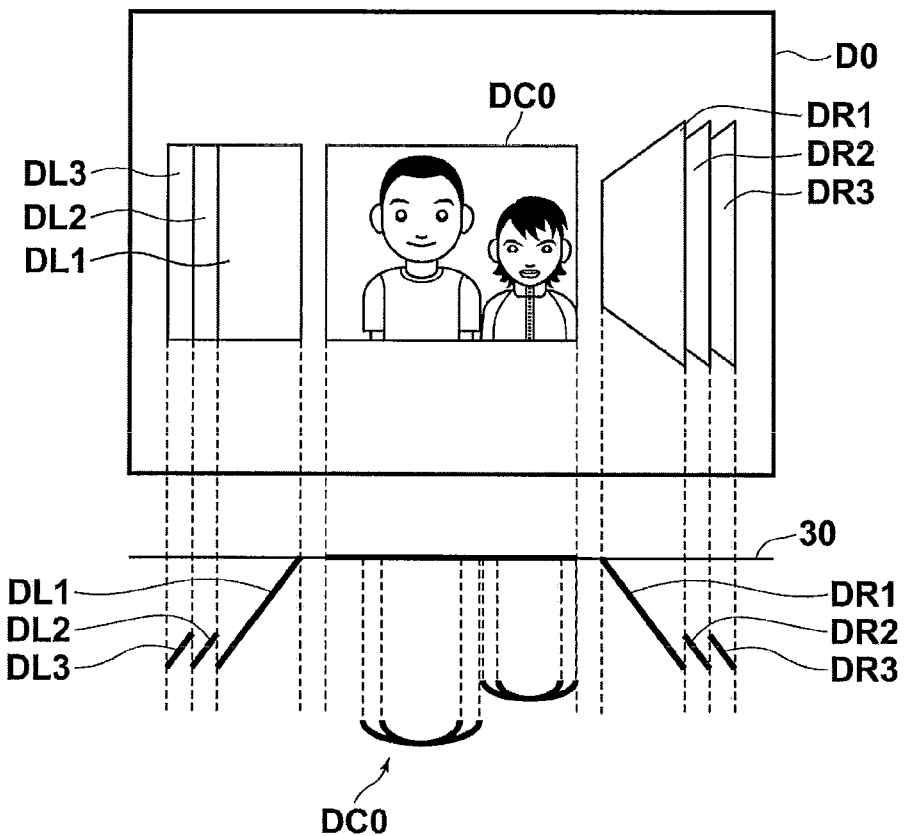
FIG. 13 is a diagram that schematically illustrates a stereoscopic layout image generated by the stereoscopic image generating apparatus of the first embodiment, and the spatial effect which are perceived when the stereoscopic layout image is viewed stereoscopically.
FIG. 14 is a diagram that illustrates the selection results of images to be arranged by a stereoscopic image generating apparatus according to a second embodiment of the present invention.

FIG. 13 is a diagram that schematically illustrates the stereoscopic layout image D0 generated by the stereoscopic image generating apparatus 1 of the first embodiment, and the spatial effect which are perceived when the stereoscopic layout image D0 is viewed stereoscopically. As illustrated in FIG. 13, the stereoscopic layout image D0 includes the image of interest DC0, left side images DL1 through DL3, and right side images DR1 through DR3. The image of interest DC0 is viewed stereoscopically such that the entire image has a spatial effect in which the subjects pictured therein appear toward the front. The left side images DL1 through DL3 appear three dimensionally as planar images which are parallel to each other and are inclined toward the image of interest DC0, because the positions of the right edges thereof are fixed and their left edges progressively protrude toward the left in the layout images G1 through G6. The right side images DR1 through DR3 appear three dimensionally as planar images which are parallel to each other and are inclined toward the image of interest DC0, because the positions of the left edges thereof are fixed and their right edges progressively protrude toward the right in the layout images G1 through G6.

Note that the image of interest DC0 is generated from reduced images of interest SC1 through SC6, in which the amount of parallax is a·Emax. The left side images DL1 through DL3 and the right side images DR1 through DR3 are generated from reduced selected images SL1 through SL6 and SR1 through SR6, in which the differences in widths are E=a·Emax. Therefore, the perceived depth of the inclination of the left side images DL1 through DL3 and the right side images DR1 through DR3 is less than the perceived depth of the image of interest DC0, when viewed stereoscopically.

As described above, the stereoscopic image generating apparatus 1 of the first embodiment generates a stereoscopic layout image D0, in which the image of interest as well as the images arranged at the right and left sides of the image of interest appear three dimensionally. Accordingly, three dimensional viewing of a plurality of images which are laid out in the same manner as CoverFlow is enabled.

Here, in the case that a subject is photographed from a plurality of photography positions, the subject faces substantially forward in images which are obtained by photography from photography positions at the center or the vicinity thereof. Therefore, these images show the subject most clearly, and what the subject is can be clearly understood. In the first embodiment, the reduced selected images generated from the images S3, which are obtained at photography positions in the vicinities of central photography positions, are arranged at the left side image arranging positions AL1 through AL3 and the right side image arranging positions AR1 through AR3. Therefore, what the subject is can be clearly understood, even if the images appear to be inclined.

The reduced selected images to be arranged at the right and left side image arranging positions are generated by reducing original images in the width directions thereof. Therefore, the left side images DL1 through DL3 and the right side images DR1 through DR3 can be caused to appear inclined toward the image of interest DC0, without complex calculations. Note that in a strict sense, merely reducing images in the width directions thereof will cause the left side images DL1 through DL3 and the right side images DR1 through DR3 to appear slightly curved when viewed stereoscopically. For this reason, calculations are performed based on the positional relationships between photography positions and viewing positions, to change the magnification rate at which the reduction is performed according to the positions toward the right and toward the left of the image of interest. Thereby, curvature of the left side images DL1 through DL3 and the right side images DR1 through DR3 can be prevented, and the appearance of the stereoscopic layout image D0 can be improved.

The plurality of reduced selected images are arranged with the edges thereof toward the image of interest arranging positions A0 at fixed positions in the layout images G1 through G6. Therefore, when the stereoscopic layout image D0 is viewed three dimensionally, the left side images DL1 through DL3 and the right side images DR1 through DR3 can be viewed three dimensionally such that they appear to be inclined in front of the image of interest DC0. Accordingly, the range of parallax when viewing the stereoscopic layout image D0 becomes substantially the same for all images included in the stereoscopic layout image D0, and fatigue during stereoscopic viewing can be reduced.

The reduced selected images are reduced in the width directions thereof. Therefore, the left side images DL1 through DL3 and the right side images DR1 through DR3 appear three dimensionally as inclined images which are parallel to each other.

Note that in the stereoscopic image generating apparatus 1 of the first embodiment, a configuration may be adopted wherein one of the left side images DL1 through DL3 and the right side images DR1 through DR3 may be selected via the input section 6. In this case, the stereoscopic layout image D0 may be regenerated with the selected image as the image of interest. This configuration enables sequential stereoscopic viewing of different images of interest.

Next, a stereoscopic image generating apparatus according to a second embodiment of the present invention will be described. Note that the stereoscopic image generating apparatuses of the second and subsequent embodiments have the same construction as the stereoscopic image generating apparatus 1 of the first embodiment, and only the processes performed thereby are different. Therefore, detailed descriptions of the components of the stereoscopic image display apparatus will be omitted here. The stereoscopic image generating apparatus 1 of the first embodiment selects the images S3, which are obtained by the camera C3 at a photography position close to the center, as the images to be arranged at the right side image arranging positions AR1 through AR3 and the left side image arranging positions AL1 through AL3. The stereoscopic image generating apparatus of the second embodiment selects images which are obtained by photography at rightward photography positions as the selected images to be arranged at the left side image arranging positions AL1 through AL3, and selects images which are obtained by photography at leftward photography positions as the selected images to be arranged at the right side image arranging positions AR1 through AR3.

FIG. 14 is a diagram that illustrates the selection results of images to be arranged by the stereoscopic image generating apparatus of the second embodiment. As illustrated in FIG. 14, the images S1 through S6 are selected as the image to be arranged at the image of interest arranging position in each of the layout images G1 through G6, respectively. In addition, the image S4, which is obtained by photography by the camera C4 at a photography position toward the right of center, is selected as the image to be arranged at the left side image arranging positions AL1 through AL3. The image S3, which is obtained by photography by the camera C3 at a photography position toward the left of center, is selected as the image to be arranged at the right side image arranging positions AR1 through AR3.

In the case that three dimensional viewing is performed, images which are displayed toward the left are visually perceived by the right eye, and images which are displayed toward the right are visually perceived by the left eye. For this reason, the left side images DL1 through DL3 and the right side images DR1 through DR3 included in the stereoscopic layout image D0 can be viewed three dimensionally in a natural manner, by selecting images which are obtained by photography at rightward photography positions to be arranged at the left side image arranging positions, and selecting images which are obtained by photography at leftward photography positions to be arranged at the right side image arranging positions.

Next, a stereoscopic image generating apparatus according to a third embodiment of the present invention will be described. The stereoscopic image generating apparatus of the third embodiment selects images which are obtained by photography at photography positions in the vicinities of central photography positions to be arranged closer to the image of interest arranging position A0, and selects images which are obtained by photography at positions farther from the central photography positions as the positions at which the selected images are to be arranged becomes farther from the image of interest arranging position A0.

FIG. 15 is a diagram that illustrates the selection results of images to be arranged by the stereoscopic image generating apparatus of the second embodiment. As illustrated in FIG.

14, the images S1 through S6 are selected as the image to be arranged at the image of interest arranging position in each of the layout images G1 through G6, respectively. The image S6, which is obtained by the camera C6 at the rightmost photography position, is selected as the image to be arranged at the left side image arranging position AL3. The image S5, which is obtained by the camera C5 at the second rightmost photography position, is selected as the image to be arranged at the left side image arranging position AL2. The image S4, which is obtained by the camera C4 at the third rightmost photography position, is selected as the image to be arranged at the left side image arranging position AL1. In addition, the image S1, which is obtained by the camera C1 at the leftmost photography position, is selected as the image to be arranged at the right side image arranging position AR3. The image S2, which is obtained by the camera C2 at the second leftmost photography position, is selected as the image to be arranged at the right side image arranging position AR2. The image S3, which is obtained by the camera C3 at the third leftmost photography position, is selected as the image to be arranged at the right side image arranging position AR1.

Three dimensional viewing can be performed most naturally if the images arranged toward the edges of the display screen are those in which the subject is viewed from afar. For this reason, the left side images DL1 through DL3 and the right side images DR1 through DR3 included in the stereoscopic layout image D0 can be viewed three dimensionally in a natural manner, by selecting images which are obtained by cameras at photography positions in the vicinities of central photography positions as the selected images to be arranged closer to the image of interest arranging position A0, and selecting images which are obtained by cameras at positions farther from the central photography positions as the positions at which the selected images are to be arranged becomes farther from the image of interest arranging position A0.

Next, a stereoscopic image generating apparatus according to a fourth embodiment of the present invention will be described. In the stereoscopic image generating apparatus of the first embodiment, the plurality of reduced selected images are arranged with the edges thereof toward the image of interest arranging positions A0 at fixed positions in the layout images G1 through G6. In the stereoscopic image generating apparatus of the fourth embodiment, a plurality of reduced selected images are arranged with the edges thereof away from the image of interest arranging positions A0 at fixed positions in the layout images G1 through G6.

Figure 16:
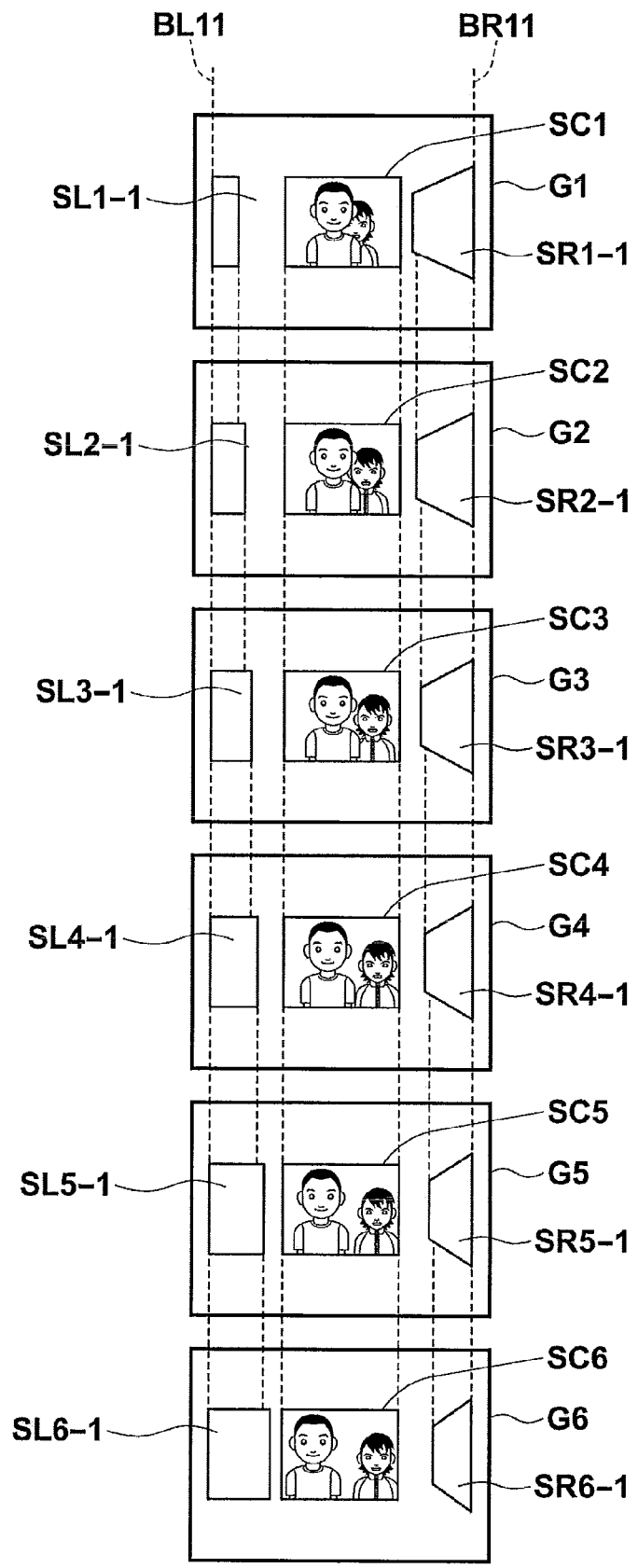
FIG. 16 is a diagram for explaining the arrangement of reduced selected images in a stereoscopic image generating apparatus according to a fourth embodiment of the present invention.

FIG. 16 is a diagram for explaining the arrangement of reduced selected images in the stereoscopic image generating apparatus of the fourth embodiment. Note that here, the arrangement of images at only the left side image arranging position AL1 and the right side image arranging position AR1 will be described, in order to simplify the description. As illustrated in FIG. 16, reduced selected images SL1-1 through SL6-1 are arranged at the left side image arranging positions AL1 of layout images G1 through G6 such that the positions of the left edges thereof are matched at a reference position BL11, which is a distance $\Delta L11$ toward the left from the left edge of reduced images of interest SC1 through SC6. Accordingly, if the layout images G1 through G6 are compared, the positions of the left edges of the reduced selected images SL1-1 through SL6-1 are the same, but the positions of the right edges thereof progressively protrude toward the right. Note that the distance $\Delta L11$ is greater than the width of the reduced selected image SL6-1.

Meanwhile, reduced selected images SR1-1 through SR6-1 are arranged at the right side image arranging positions AR1 of layout images G1 through G6 such that the right edges thereof are matched at a reference position BR11, which is a distance $\Delta R11$ toward the right from the right edge of the reduced images of interest SC1 through SC6. Accordingly, if the layout images G1 through G6 are compared, the positions of the right edges of the reduced selected images SR1-1 through SR6-1 which are arranged at the right side image arranging positions AR1 are the same, but the left edges thereof progressively become positioned toward the right. Note that the distance $\Delta R11$ is greater than the width of the reduced selected image SR1-1.

Figure 17:
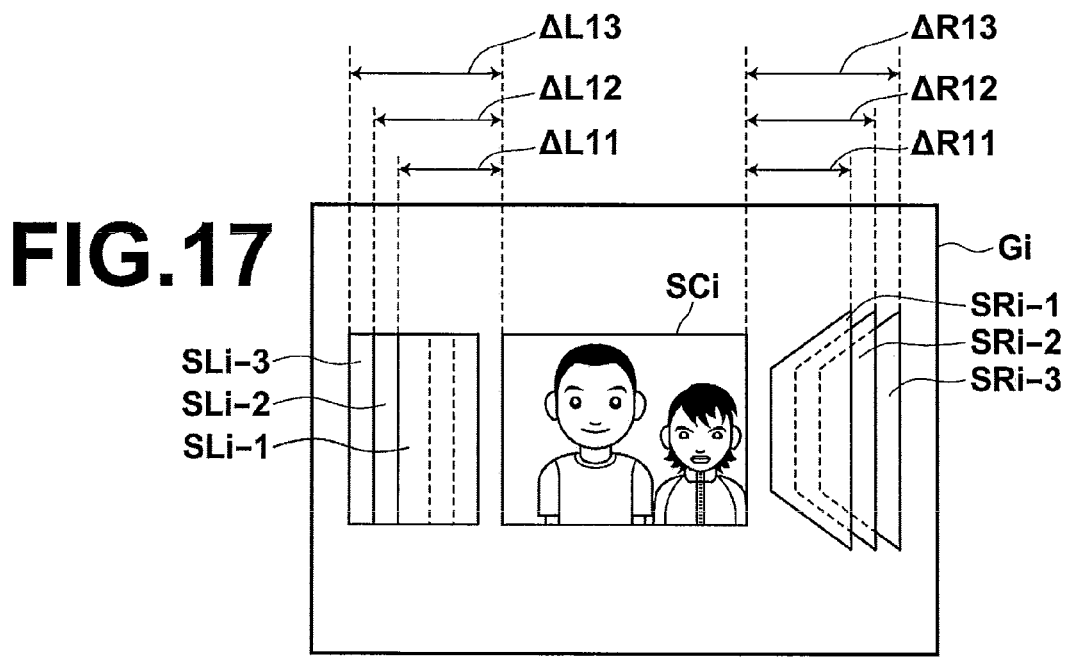
FIG. 17 is a diagram that illustrates a layout image generated by the stereoscopic image generating apparatus of the fourth embodiment.

FIG. 17 is a diagram that illustrates a layout image generated by the stereoscopic image generating apparatus of the fourth embodiment. As illustrated in FIG. 17, a reduced image of interest SCi is arranged at the center of a layout image Gi. Reduced selected images SLi-1, SLi-2, and SLi-3 are arranged with their left edges matched at positions which are distances of $\Delta L11$, $\Delta L12$, and $\Delta L13$ away from the left edge of the reduced image of interest SCi, respectively. Reduced selected images SRi-1, SRi-2, and SRi-3 are arranged with their right edges matched at positions which are distances of $\Delta R11$, $\Delta R12$, and $\Delta R13$ away from the right edge of the reduced image of interest SCi, respectively.

Figure 18:
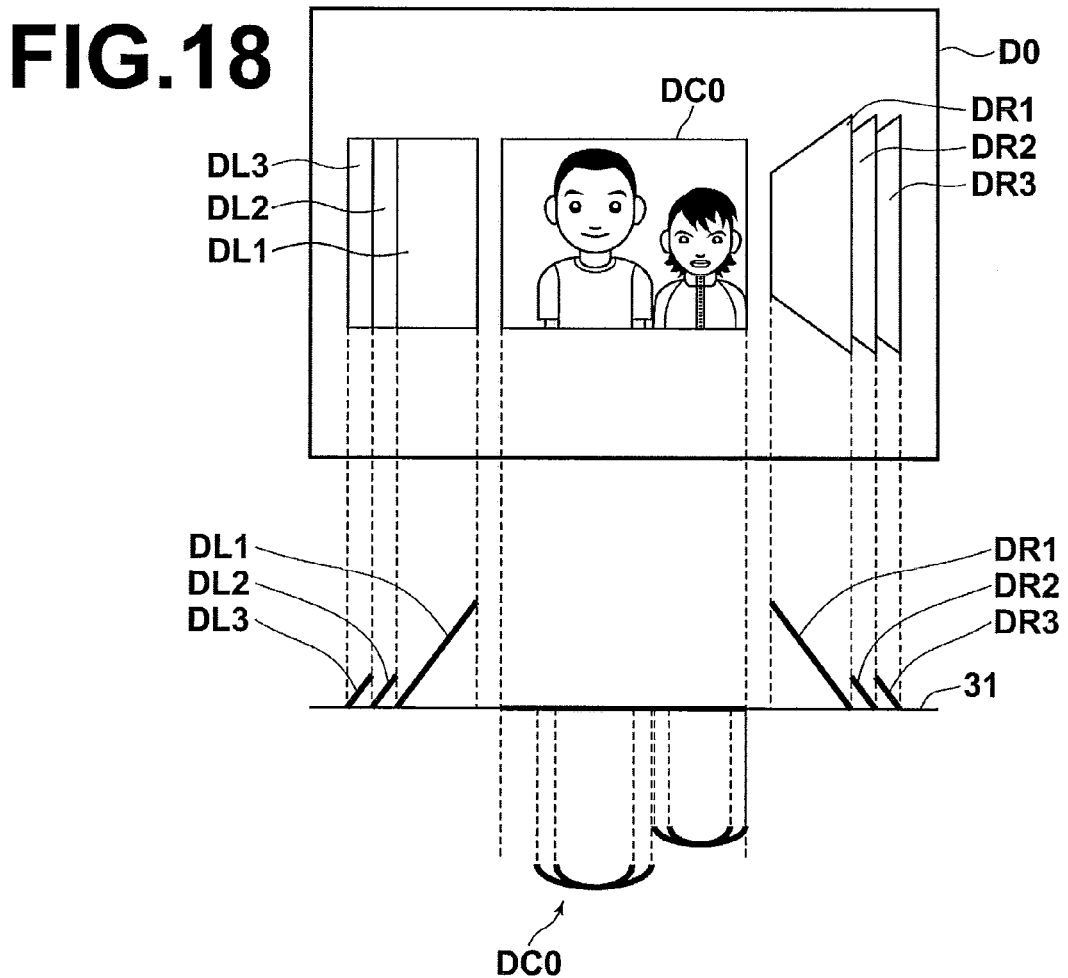
FIG. 18 is a diagram that schematically illustrates a stereoscopic layout image generated by the stereoscopic image generating apparatus of the fourth embodiment, and the spatial effect which are perceived when the stereoscopic layout image is viewed stereoscopically.

FIG. 18 is a diagram that schematically illustrates the stereoscopic layout image D0 generated by the stereoscopic image generating apparatus of the fourth embodiment, and the spatial effect which are perceived when the stereoscopic layout image D0 is viewed stereoscopically. As illustrated in FIG. 18, the stereoscopic layout image D0 includes an image of interest DC0, left side images DL1 through DL3, and right side images DR1 through DR3. The image of interest DC0 is viewed stereoscopically such that the entire image has a spatial effect in which the subjects pictured therein appear toward the front. The left side images DL1 through DL3 appear three dimensionally as planar images which are parallel to each other and are inclined toward the image of interest DC0 with their right edges behind a display screen 31, because the positions of the left edges thereof are fixed and their right edges progressively protrude toward the right in the layout images G1 through G6. The right side images DR1 through DR3 appear three dimensionally as planar images which are parallel to each other and are inclined toward the image of interest DC0 with their left edges behind the display screen 31, because the positions of the right edges thereof are fixed and their left edges progressively protrude toward the left in the layout images G1 through G6.

In the stereoscopic image generating apparatus of the fourth embodiment, the reduced selected images are arranged with the edges thereof opposite the side of the image of interest arranging position A0 at fixed positions. Therefore, when the stereoscopic layout image D0 is viewed three dimensionally, the left side images DL1 through DL3 and the right side images DR1 through DR3 are viewed three dimensionally such that they appear to be inclined at positions behind the display screen 31. Accordingly, the left side images DL1 through DL3 and the right side images DR1 through DR3 are viewed three dimensionally such that they appear to be inclined at positions further away than the image of interest DC0, and the image of interest and other images can be easily distinguished.

Next, a stereoscopic image generating apparatus according to a fifth embodiment of the present invention will be described. In the stereoscopic image generating apparatus of the first embodiment, the plurality of reduced selected images are arranged with the edges thereof toward the image of interest arranging positions A0 at fixed positions in the layout images G1 through G6. In the stereoscopic image generating apparatus of the fifth embodiment, a plurality of reduced selected images are arranged with the central portions thereof at fixed positions in the layout images G1 through G6.

Figure 19:
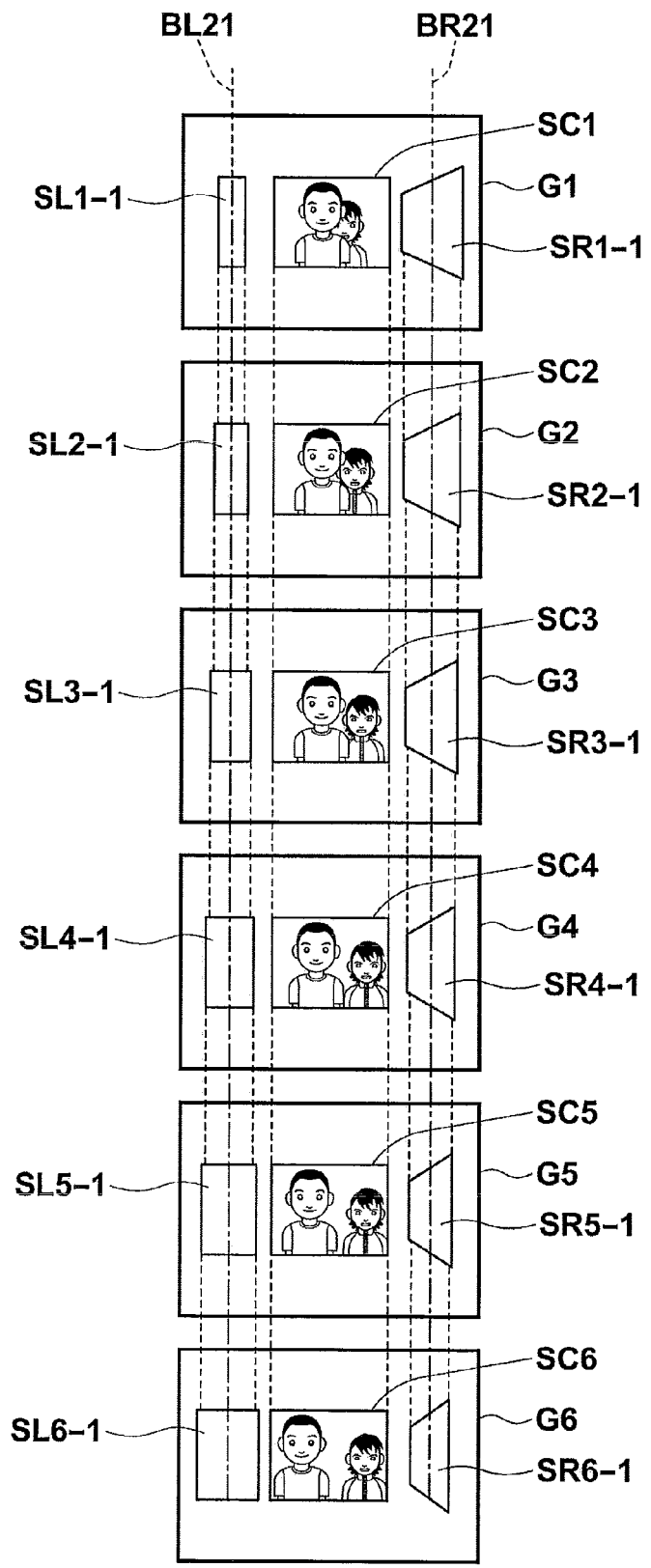
FIG. 19 is a diagram for explaining the arrangement of reduced selected images in a stereoscopic image generating apparatus according to a fifth embodiment of the present invention.

FIG. 19 is a diagram for explaining the arrangement of reduced selected images in the stereoscopic image generating apparatus of the fifth embodiment. Note that here, the arrangement of images at only the left side image arranging position AL1 and the right side image arranging position AR1 will be described, in order to simplify the description. As illustrated in FIG. 19, reduced selected images SL1-1 through SL6-1 are arranged at the left side image arranging positions AL1 of layout images G1 through G6 such that the positions of bisecting lines that extend in the vertical directions thereof (that is, center lines) are matched at a reference position BL21, which is a distance ΔL21 toward the left from the left edge of reduced images of interest SC1 through SC6. Accordingly, if the layout images G1 through G6 are compared, the positions of the center lines of the reduced selected images SL1-1 through SL6-1 are the same, but the positions of the left and right edges thereof progressively protrude toward the exterior.

Meanwhile, reduced selected images SR1-1 through SR6-1 are arranged at the right side image arranging positions AR1 of layout images G1 through G6 such that the center lines thereof are matched at a reference position BR21, which is a distance ΔR21 toward the right from the right edge of the reduced images of interest SC1 through SC6. Accordingly, if the layout images G1 through G6 are compared, the positions of the center lines of the reduced selected images SR1-1 through SR6-1 which are arranged at the right side image arranging positions AR1 are the same, but the left and right edges thereof progressively become positioned toward the center line.

FIG. 20 is a diagram that illustrates a layout image generated by the stereoscopic image generating apparatus of the fifth embodiment. As illustrated in FIG. 20, a reduced image of interest SCi is arranged at the center of a layout image Gi. Reduced selected images SLi-1, SLi-2, and SLi-3 are arranged with their center lines matched at positions which are distances of ΔL21, ΔL22, and ΔL23 away from the left edge of the reduced image of interest SCi, respectively. Reduced selected images SRi-1, SRi-2, and SRi-3 are arranged with their center matched at positions which are distances of ΔR21, ΔR22, and ΔR23 away from the right edge of the reduced image of interest SCi, respectively.

FIG. 21 is a diagram that schematically illustrates the stereoscopic layout image D0 generated by the stereoscopic image generating apparatus of the fifth embodiment, and the spatial effect which are perceived when the stereoscopic layout image D0 is viewed stereoscopically. As illustrated in FIG. 21, the stereoscopic layout image D0 includes an image of interest DC0, left side images DL1 through DL3, and right side images DR1 through DR3. The image of interest DC0 is viewed stereoscopically such that the entire image has a spatial effect in which the subjects pictured therein appear toward the front. The left side images DL1 through DL3 appear three dimensionally as planar images which are parallel to each other and are inclined toward the image of interest DC0 with their left edges protruding toward a viewer and their right edges behind a display screen 32, because the positions of the center lines thereof are fixed and their left and right edges progressively protrude toward the exterior in the layout images G1 through G6. The right side images DR1 through DR3 appear three dimensionally as planar images which are parallel to each other and are inclined toward the image of interest DC0 with their right edges protruding toward the viewer and their left edges behind the display screen 32, because the positions of the center lines thereof are fixed and their left and right edges are progressively positioned toward the center line in the layout images G1 through G6.

Note that in the layout images G1 through G6, the positions of the center lines of the reduced selected images are fixed. Therefore, the amounts of the left side images DL1 through DL3 and the amounts of the right side images DR1 through DR3 that appear behind the display screen 32 and that protrude toward the viewer are equal. The amounts of the left side images DL1 through DL3 and the amounts of the right side images DR1 through DR3 that appear behind the display screen 32 and that protrude toward the viewer may be changed, by shifting the position at which the reduced selected images are fixed within the layout images G1 through G6.

In this manner, the reduced selected images are arranged in the layout images G1 through G6 with the center lines thereof at fixed positions. Therefore, when the stereoscopic layout image D0 is viewed three dimensionally, the center lines of the left side images DL1 through DL3 and the right side images DR1 through DR3 match the display screen 32 of the image of interest DC0. For this reason, the edges of the left side images DL1 through DL3 and the right side images DR1 through DR3 toward the side opposite the image of interest DC0 appear to be inclined in front of the image of interest DC0, and the edges of the left side images DL1 through DL3 and the right side images DR1 through DR3 toward the sides toward the image of interest DC0 appear to be inclined behind the image of interest DC0. Accordingly, the range of parallax when viewing the stereoscopic layout image D0 does not become large, and further, the image of interest and the other images can be easily distinguished.

Next, a stereoscopic image generating apparatus according to a sixth embodiment of the present invention will be described. In the stereoscopic image generating apparatus of the first embodiment, the width of the reduced selected images are constant regardless of the position at which they are arranged. In the stereoscopic image generating apparatus of the sixth embodiment, the widths of the reduced selected images are smaller the farther away from the image of interest arranging position A0 they are to be positioned at.

That is, in the sixth embodiment, the second layout section 4 generates reduced selected images SL1-1 through SL6-1 by reducing selected images to be arranged at the left side image arranging positions AL1 using six different magnification rates bi through b6 in the same manner as in the first embodiment. However, the second layout section 4 generates reduced selected images SL1'-2 through SL6'-2 by reducing selected images to be arranged at the left side image arranging positions AL2 using six different magnification rates c1 through c6 (bi>ci). Further, the second layout section 4 generates reduced selected images SL1"-3 through SL6"-3 by reducing selected images to be arranged at the left side image arranging positions AL3 using six different magnification rates d1 through d6 (ci>di).

Meanwhile, the second layout section 4 generates reduced elected images SR1-1 through SR6-1 by reducing selected images to be arranged at the right side image arranging positions AR1 using six different magnification rates b1 through b6 in the same manner as in the first embodiment. However, the second layout section 4 generates reduced selected images SR1'-2 through SR6'-2 by reducing selected images to be arranged at the right side image arranging positions AR2 using six different magnification rates c1 through c6 (bi>ci). Further, the second layout section 4 generates reduced selected images SR1"-3 through SR6"-3 by reducing selected images to be arranged at the right side image arranging positions AR3 using six different magnification rates d1 through d6 (ci>di).

Figure 22:
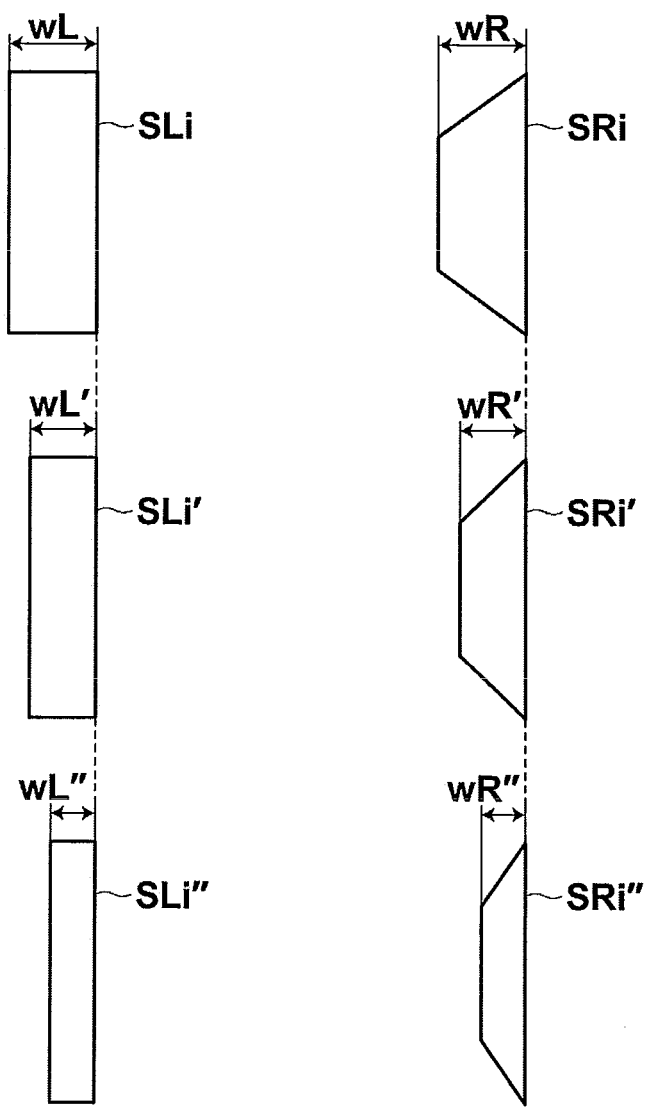
FIG. 22 is a diagram that illustrates the sizes of reduced selected images to be arranged in layout images by a stereoscopic image generating apparatus according to a sixth embodiment of the present invention.

FIG. 22 is a diagram that illustrates the sizes of reduced selected images to be arranged in layout images by the stereoscopic image generating apparatus of the sixth embodiment. Note that FIG. 22 illustrates reduced selected images to be arranged within a single layout image Gi. As illustrated in FIG. 22, the widths wL, wL', and wL" of reduced selected images SLi, SLi', and SLi" to be arranged in the left side image arranging positions AL1 through AL3 have the relationships wL>wL'>wL". In addition, the widths wR, wR', and wR" of reduced selected images SRi, SRi', and SRi" to be arranged in the right side image arranging positions AR1 through AR3 have the relationships wR>wR'>wR".

Figure 23:
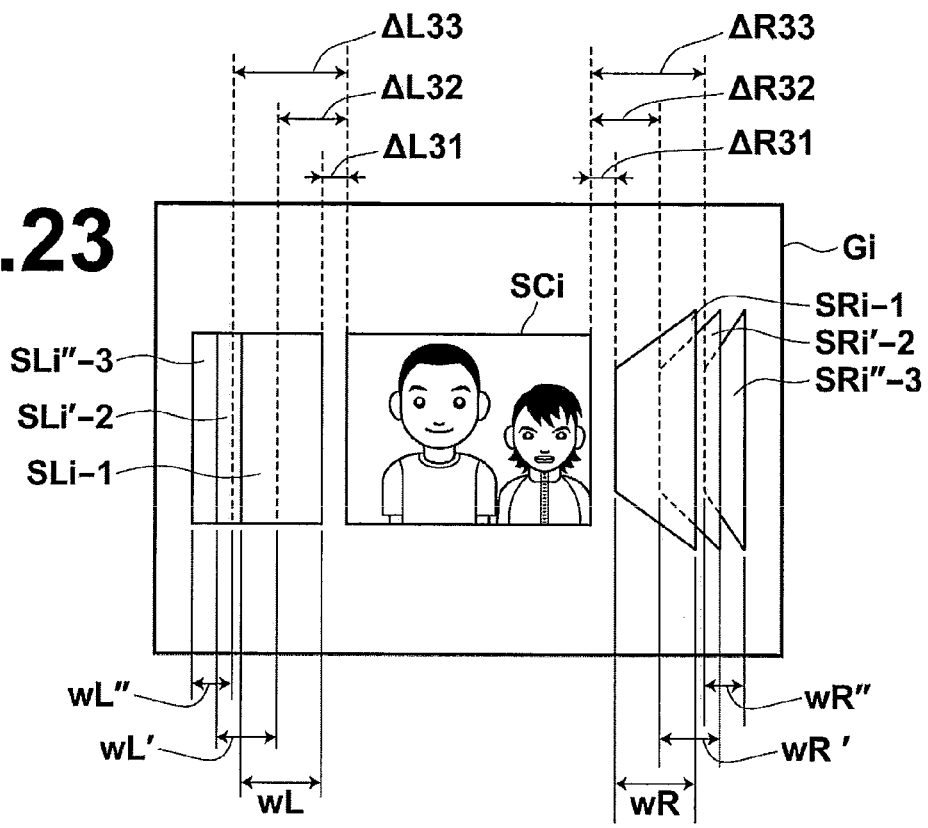
FIG. 23 is a diagram that illustrates a layout image generated by the stereoscopic image generating apparatus of the sixth embodiment.

FIG. 23 is a diagram that illustrates a layout image generated by the stereoscopic image generating apparatus of the sixth embodiment. As illustrated in FIG. 23, a reduced image of interest SCi is arranged at the center of a layout image Gi. Reduced selected images SLi-1, SLi'-2, and SLi"-3 are arranged with their right edges matched at positions which are distances of ΔL31, ΔL32, and ΔL33 away from the left edge of the reduced image of interest SCi, respectively. Reduced selected images SRi-1, SRi'-2, and SRi"-3 are arranged with their left edges matched at positions which are distances of ΔR31, ΔR32, and ΔR33 away from the right edge of the reduced image of interest SCi, respectively.

Figure 24:
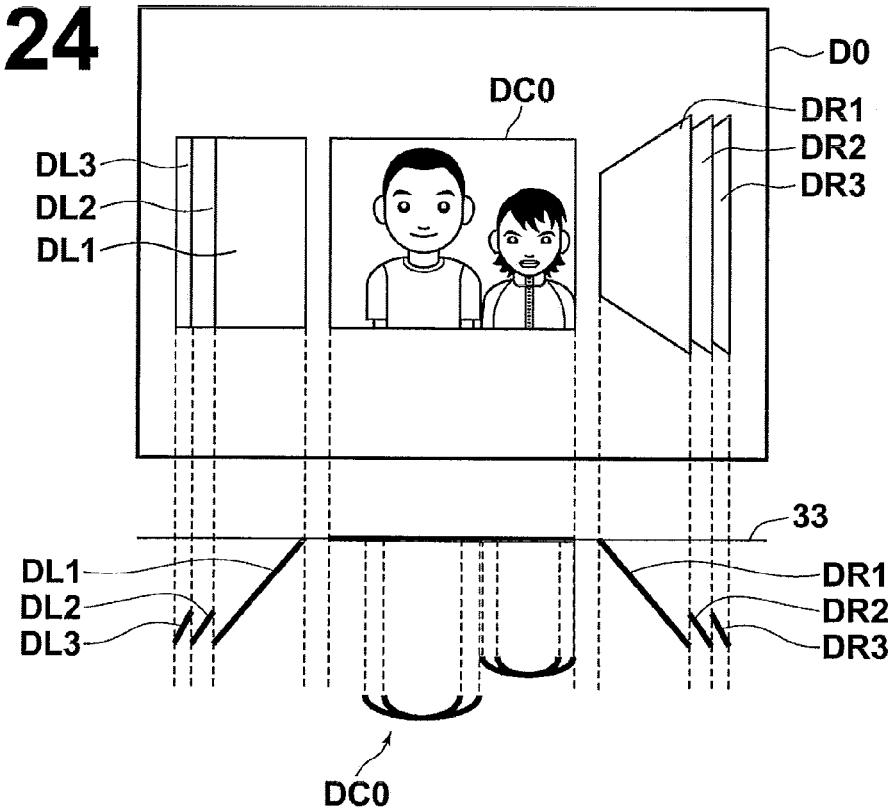
FIG. 24 is a diagram that schematically illustrates a stereoscopic layout image generated by the stereoscopic image generating apparatus of the sixth embodiment, and the spatial effect which are perceived when the stereoscopic layout image is viewed stereoscopically.

FIG. 24 is a diagram that schematically illustrates the stereoscopic layout image D0 generated by the stereoscopic image generating apparatus of the fifth embodiment, and the spatial effect which are perceived when the stereoscopic layout image D0 is viewed stereoscopically. As illustrated in FIG. 24, the stereoscopic layout image D0 includes an image of interest DC0, left side images DL1 through DL3, and right side images DR1 through DR3. The image of interest DC0 is viewed stereoscopically such that the entire image has a spatial effect in which the subjects pictured therein appear toward the front. The left side images DL1 through DL3 appear three dimensionally as planar images which are inclined toward the image of interest DC0 with greater angles of inclination in the leftward images, because the positions of the right edges thereof are fixed and their left edges progressively protrude toward the left in the layout images G1 through G6. The right side images DR1 through DR3 appear three dimensionally as planar images which are inclined toward the image of interest DC0 with greater angles of inclination in the rightward images, because the positions of the left edges thereof are fixed and their right edges progressively protrude toward the right in the layout images G1 through G6.

Figure 25:
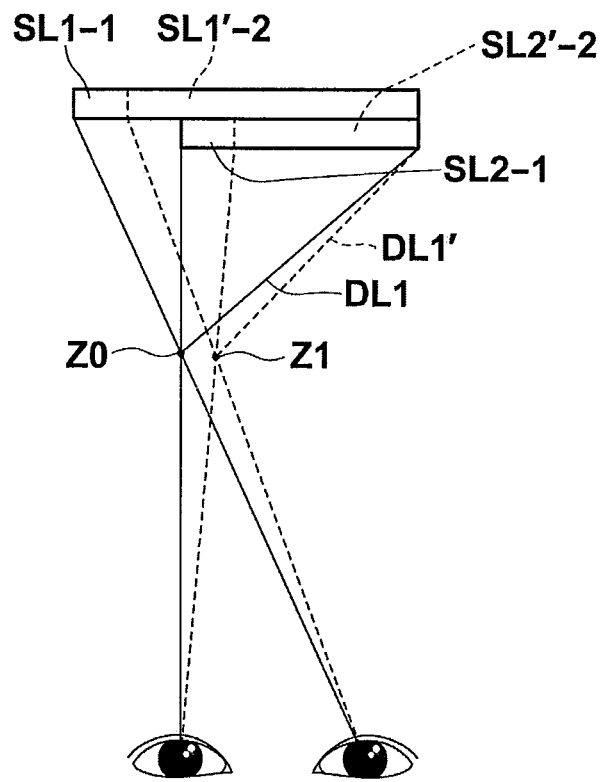
FIG. 25 is a diagram for explaining the spatial effects which are perceived when performing stereoscopic viewing in the sixth embodiment.
Figure 26:
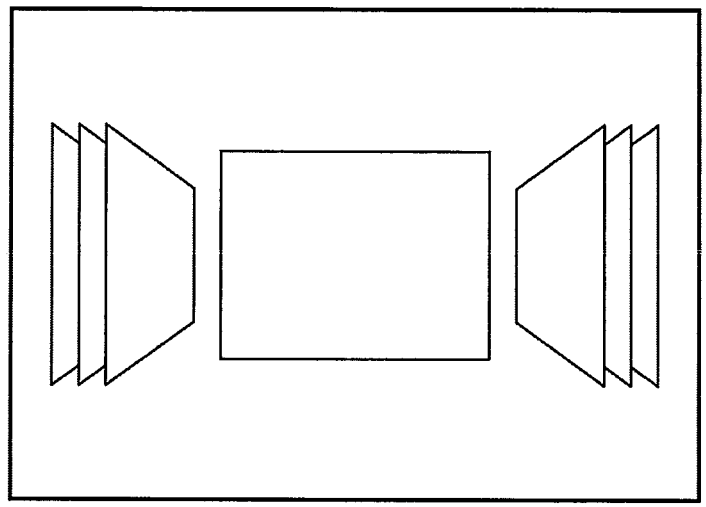
FIG. 26 is a diagram that illustrates image arrangement in CoverFlow.

FIG. 25 is a diagram for explaining the spatial effects which are perceived when viewing reduced selected images SL1-1 and SL2-1, and reduced selected images SL1'-1 and SL2'-1 stereoscopically. The right edges of the reduced selected images SL1-1 and SL2-1 are fixed, and the positions of the left edges thereof differ. Therefore, when the left edges of the reduced selected images SL1-1 and SL2-1 are stereoscopically viewed, the lines of sight of the left and right eyes cross at point Z0. Accordingly, the left side image DL1 is stereoscopically viewed such that the left edge thereof appears to be inclined toward the point Z0, which is toward the viewer.

On the other hand, because the widths of the reduced selected images SL1'-1 and SL2'-2 are smaller than the widths of the reduced selected images SL1-1 and SL2-1, if the left edges of the reduced selected images SL1'-1 and SL2'-1 are viewed stereoscopically, the lines of sight of the left and right eyes cross at a point Z1, which is more toward the viewer than the point Z0. For this reason, the left side image DL1' appears to be inclined at a greater angle than the left side image DL1.

In this manner, the stereoscopic image generating apparatus of the sixth embodiment enables a stereoscopic layout image D0 to be displayed with different spatial effects from that displayed by the stereoscopic image generating apparatus of the first embodiment.

Here, the reference position by which the reduced selected images are arranged in the sixth embodiment may be changed in manners similar to those of the fourth and fifth embodiments. Thereby, the inclinations can appear to be greater in left side images and right side images which are further away from the image of interest C0 in stereoscopic layout images generated by the stereoscopic image generating apparatuses of the fourth and fifth embodiments as well.

Note that in the embodiments described above, six images S1 through S6, which are obtained at six photography positions, are used to generate stereoscopic layout images D0 which are stereoscopically viewable from five viewing positions P1 through P5. However, the number of photography positions need only be two or greater, and the number of viewing positions may be that which corresponds to the number of photography positions.

In the embodiments described above, the display section 7 performs stereoscopic display using the parallax barrier method. Alternatively, the display section 7 may perform stereoscopic display using the lenticular method. Particularly in the case that there are two layout images, the stereoscopic layout image D0 may be generated by changing the colors in the layout images to be different, such as red and blue, then overlapping the layout images (the anaglyph method). Alternatively, the stereoscopic layout image D0 may be generated by changing the polarization directions of the layout images to be different, then overlapping the layout images (the polarization filter method). In these cases, stereoscopic images can be viewed three dimensionally, by viewers' eyes stereoscopically viewing the stereoscopic images, which are displayed using red/blue glasses or polarizing glasses, using the automatic focusing function of the eyes. As a further alternative, image separating glasses may be utilized, and left and right images may be alternately displayed, to display the stereoscopic layout image D0 (the time division method).

In the embodiments described above, the left side images DL1 through DL3 and the right side images DR1 through DR3 are realized by the reduced selected images SL1 through SL6 and the reduced selected images SR1 through SR6. Alternatively, the stereoscopic image generating apparatus of the present invention may be equipped with a three dimensional calculating engine, and computer graphic planes which are inclined toward the image of interest may be generated. The spatial effects of the left side images DL1 through DL3 and the right side images DR1 through DR3 may be realized, by mapping and rendering images onto the computer generated planes.

In the embodiments described above, the first layout section 3 selects which images from among the images S1 through S6 are to be arranged in the image arranging positions A0, AL1 through AL3 and AR1 through AR3 of the layout images G1 through G6. Alternatively, an image selecting section may be provided as a component separate from the first layout section 3, and the image selecting section may select which images from among the images S1 through S6 are to be arranged in the image arranging positions A0, AL1 through AL3 and AR1 through AR3 of the layout images G1 through G6.

Embodiments of the stereoscopic image generating apparatus 1 have been described above. A program that causes a computer to function as the first layout section 3, the second layout section 4, the stereoscopic converting section 5, and the control section 8 described above, to perform the process illustrated in FIG. 12 is also an embodiment of the present invention. In addition, computer readable media having such a program recorded therein is also an embodiment of the present invention.

What is claimed is:

1. A stereoscopic image generating apparatus, comprising:
    image obtaining unit, for obtaining a plurality of image groups, each image group constituted by a plurality of images for generating stereoscopic images and obtained by photography of subjects from different viewpoints; and
    image layout unit, for generating a stereoscopic layout image, in which a single image group selected from among the plurality of image groups as an image of interest is arranged at a predetermined position on a display screen in a stereoscopically viewable manner, and selected images from among the image groups other than the single image group are arranged such that they appear to be inclined and facing toward the predetermined position on the display screen at at least one of the right and left sides of the predetermined position;
    the image layout unit further comprising:
    first layout unit, for arranging a plurality of images of interest, which are included in the selected single image group, at the predetermined position corresponding to the plurality of viewpoints for generating the stereoscopic layout image within a plurality of layout images;
    second layout unit, for reducing the selected images in the width directions thereof at different reduction rates to generate a plurality of reduced selected images for each of the plurality of layout images in which the selected images are arranged, and arranging the plurality of reduced selected images, using a predetermined reference position at at least one of the right and left sides of the predetermined position at corresponding arrangement positions within the plurality of layout images as references; and
    stereoscopic converting unit, for generating the stereoscopic layout image from the plurality of layout images, in which the plurality of images of interest and the plurality of reduced selected images are arranged.

2. The stereoscopic image generating apparatus as defined in claim 1, wherein:
    the image layout unit selects images which are obtained by photography at central photography positions and at photography positions in the vicinities of central photography positions as the selected images, from among the images included in the image groups other than the single image group.

3. The stereoscopic image generating apparatus as defined in claim 1, wherein:
    the image layout unit selects images which are obtained by photography at rightward photography positions as the selected images to be arranged at the left side of the predetermined position, and selects images which are obtained by photography at leftward photography positions as the selected images to be arranged at the right side of the predetermined position, from among the images included in the image groups other than the single image group.

4. The stereoscopic image generating apparatus as defined in claim 1, wherein:
    the image layout unit selects images which are obtained by photography at central photography positions and at photography positions in the vicinities of central photography positions as the selected images to be arranged closer to the predetermined position, and selects images which are obtained by photography at positions farther from the central photography positions as the positions at which the selected images are to be arranged becomes farther from the predetermined position, from among the images included in the image groups other than the single image group.

5. The stereoscopic image generating apparatus as defined in claim 1 wherein:
    the second layout unit matches the edges of the plurality of reduced selected images toward the side of the predetermined position with the reference positions within the plurality of layout images, and arranges the plurality of reduced selected images within each of the plurality of layout images.

6. The stereoscopic image generating apparatus as defined in claim 1, wherein:
    the second layout unit matches the edges of the plurality of reduced selected images at the side opposite the side toward the predetermined position with the reference positions within the plurality of layout images, and arranges the plurality of reduced selected images within each of the plurality of layout images.

7. The stereoscopic image generating apparatus as defined in claim 1, wherein:
    the second layout unit matches portions other than the edges of the plurality of reduced selected images with the reference positions within the plurality of layout images, and arranges the plurality of reduced selected images within each of the plurality of layout images.

8. The stereoscopic image generating apparatus as defined in claim 1, wherein:
    the second layout unit generates the plurality of reduced selected images at the same reduction rate for selected images to be arranged within each of the layout images, when arranging the plurality of selected images within the layout images.

9. The stereoscopic image generating apparatus as defined in claim 1, wherein:
    the second layout unit generates the plurality of reduced selected images at a greater reduction rate for selected images to be arranged farther away from the predetermined position, when arranging the plurality of selected images within the layout images.

10. The stereoscopic image generating apparatus as defined in claim 1, wherein:
    the second layout unit sets the reduction rate of the selected images such that the parallax therein becomes less than or equal to the parallax of the plurality of images of interest within the selected single image group.

11. A stereoscopic image generating apparatus as defined in claim 1, wherein:
    the second layout unit reduces the reduction rate for the reduced selected images corresponding to the viewpoints more toward the left when the plurality of reduced selected images in the case that the arrangement positions of the reduced selected images are to the left of the predetermined position, and reduces the reduction rate for the reduced selected images corresponding to the viewpoints more toward the right when the plurality of reduced selected images in the case that the arrangement positions of the reduced selected images are to the right of the predetermined position.

12. A stereoscopic image generating method, comprising the steps of:

obtaining a plurality of image groups, each image group constituted by a plurality of images for generating stereoscopic images and obtained by photography of subjects from different viewpoints; and generating a stereoscopic layout image, in which a single image group selected from among the plurality of image groups as an image of interest is arranged at a predetermined position on a display screen in a stereoscopically viewable manner, and selected images from among the image groups other than the single image group are arranged such that they appear to be inclined and facing toward the predetermined position on the display screen at at least one of the right and left sides of the predetermined position, wherein:

a plurality of images of interest, which are included in the selected single image group, being arranged at the predetermined position corresponding to the plurality of viewpoints for generating the stereoscopic layout image within a plurality of layout images;

the selected images being reduced in the width directions thereof at different reduction rates to generate a plurality of reduced selected images for each of the plurality of layout images in which the selected images are arranged, and arranging the plurality of reduced selected images, using a predetermined reference position at at least one of the right and left sides of the predetermined position at corresponding arrangement positions within the plurality of layout images as references; and the stereoscopic layout image being generated from the plurality of layout images, in which the plurality of images of interest and the plurality of reduced selected images are arranged.

13. A non-transitory computer readable medium having recorded therein a program that causes a computer to execute a stereoscopic image generating method, comprising the procedures of:

obtaining a plurality of image groups, each image group constituted by a plurality of images for generating stereoscopic images and obtained by photography of subjects from different viewpoints; and generating a stereoscopic layout image, in which a single image group selected from among the plurality of image groups as an image of interest is arranged at a predetermined position on a display screen in a stereoscopically viewable manner, and selected images from among the image groups other than the single image group are arranged such that they appear to be inclined and facing toward the predetermined position on the display screen at at least one of the right and left sides of the predetermined position, wherein a plurality of images of interest, which are included in the selected single image group, being arranged at the predetermined position corresponding to the plurality of viewpoints for generating the stereoscopic layout image within a plurality of layout images;

the selected images being reduced in the width directions thereof at different reduction rates to generate a plurality of reduced selected images for each of the plurality of layout images in which the selected images are arranged, and arranging the plurality of reduced selected images, using a predetermined reference position at at least one of the right and left sides of the predetermined position at corresponding arrangement positions within the plurality of layout images as references; and the stereoscopic layout image being generated from the plurality of layout images, in which the plurality of images of interest and the plurality of reduced selected images are arranged.

* * * * *